(12) United States Patent
Arai et al.

(10) Patent No.: US 9,011,590 B2
(45) Date of Patent: *Apr. 21, 2015

(54) INK SET AND IMAGE FORMING METHOD

(75) Inventors: Takuya Arai, Kanagawa (JP); Ryo Saito, Kanagawa (JP); Akira Takeda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 132 days.

This patent is subject to a terminal disclaimer.

(21) Appl. No.: 13/523,247

(22) Filed: Jun. 14, 2012

(65) Prior Publication Data

US 2012/0320121 A1  Dec. 20, 2012

(30) Foreign Application Priority Data

Jun. 17, 2011  (JP) .................................. 2011-135771
Aug. 1, 2011  (JP) .................................. 2011-168498

(51) Int. Cl.
*C09D 11/02* (2014.01)
*C09D 11/322* (2014.01)
*C09D 11/40* (2014.01)
*C09D 11/54* (2014.01)

(52) U.S. Cl.
CPC .............. *C09D 11/322* (2013.01); *C09D 11/40* (2013.01); *C09D 11/54* (2013.01)

(58) Field of Classification Search
CPC ...................................................... C09D 11/54
USPC ....................................................... 106/31.6
See application file for complete search history.

(56) References Cited

U.S. PATENT DOCUMENTS

| | | | |
|---|---|---|---|
| 2008/0022891 A1 | 1/2008 | Pulina et al. | |
| 2008/0117273 A1* | 5/2008 | Yamashita et al. | 347/96 |
| 2010/0055325 A1* | 3/2010 | Sakai et al. | 427/261 |
| 2010/0080913 A1* | 4/2010 | Irita | 427/258 |
| 2010/0227065 A1 | 9/2010 | Yanagi et al. | |
| 2012/0026240 A1* | 2/2012 | Saito | 347/21 |
| 2012/0320123 A1* | 12/2012 | Takeda et al. | 347/21 |

FOREIGN PATENT DOCUMENTS

| | | |
|---|---|---|
| JP | 2008-501044 | 1/2008 |
| JP | 2008-126413 | 6/2008 |
| JP | 2008-265122 | 11/2008 |
| JP | 2009-137053 | 6/2009 |
| JP | 2010-046945 | 3/2010 |
| JP | 2010-069805 | 4/2010 |
| JP | 2010-188661 | 9/2010 |
| JP | 2011-088323 | 5/2011 |
| JP | 2012-136807 | 7/2012 |

OTHER PUBLICATIONS

Extended European Search Report—EP 12 17 0507—Aug. 16, 2013.
JP Office Action dated Aug. 27, 2013, with English Translation; Application No. 2011-168498.
CN Office Action dated Oct. 29, 2014; Application No: 201210177246.7; Notice of Reasons for Rejection.

* cited by examiner

*Primary Examiner* — Veronica F Faison
(74) *Attorney, Agent, or Firm* — Young & Thompson

(57) ABSTRACT

An ink set is provided in which an image with suppressed roughness may be formed. The ink set includes an ink composition containing resin particles and a pigment, and a process liquid containing an organic acidic compound including a compound represented by General Formula (I).

$$C_nH_{2n+2-m}(COOH)_m \qquad \text{General Formula (I)}$$

[wherein, in General Formula (I), n represents an integer of greater than or equal to 2 and m represents an integer of greater than or equal to 3.]

13 Claims, No Drawings

INK SET AND IMAGE FORMING METHOD

BACKGROUND OF THE INVENTION

1. Field of the Invention

The present invention relates to an ink set and an image forming method.

2. Description of the Related Art

A recording method using an ink jet method is widely used in terms that it may record a high quality image on a wide variety of recording media by discharging ink in a droplet form from a number of nozzle holes provided in an ink jet head.

In an image recording using the ink jet method, an image recording method may be used in which an image is formed by contacting a pigment ink with a process liquid which aggregates ingredients in the pigment ink. A combination of the pigment ink and the process liquid such as this is referred to as an ink set.

For example, as an image recording method that may suppress the curl of a recording medium, the image recording method in which the pigment ink and the process liquid containing a polybasic acid having greater than or equal to two carboxyl groups or hydroxyl groups within the molecule is used as a combination is known (for example, see JP2008-126413A).

Also, as an ink set which may form a uniform image where dot diameters are identical, the ink set including the pigment ink and the process liquid having at least one of a polyvalent organic acid, polyphosphoric acid, and metaphosphoric acid (the process liquid) is known (for example, see JP2010-188661A).

Also, as an ink set which may improve bleeding or a show through, the ink set including a combination of the pigment ink and the process liquid having a polyvalent metal salt, tricarballylic acids and a liquid medium (a process liquid) is known (for example, see JP2008-265122A).

Also, as an ink jet recording method in which a picture quality of the image is outstanding, the ink jet recording method including a process liquid applying step for applying process liquid containing an aggregating agent which aggregates ingredients in the ink composition (for example, an organic carboxylic acid having greater than or equal to divalence) on the recording medium before discharging the ink composition which forms an ink image, and an ink recording step for recording the image using the ink composition of at least two types of ink with different surface tension is known (for example, see JP2010-46945A).

Also, as an ink set which has an excellent ink aggregating property and may record an image with superior scratch resistance and picture quality at high speed, the ink set including the ink composition containing a pigment, resin particles, and a polymerizable compound, the aggregating agent which aggregates ingredients in the ink composition (for example, an organic acid having greater than or equal to divalence), and the process liquid containing the polymerizable compound is known (for example, see JP2010-69805A).

SUMMARY OF THE INVENTION

However, in the ink set disclosed in Patent Literature Documents 1 to 5, there may be cases in which the images formed become rough. As one reason for the image roughness, movement of ink drops (ink dots) ejected on the recording medium may be considered.

The object of the present invention is to provide an ink set and an image forming method in which an image with suppressed roughness is formed.

The inventors found that, by using a combination of an ink composition containing resin particles and a process liquid having an alkane polycarboxylic acid with greater than or equal to 3 carboxyl groups, movement of ink drops ejected on a recording medium is suppressed and image roughness may be improved as a result, and completed the present invention based on these findings.

That is, specific aspects in order to accomplish the challenges are as follows.

<1> An ink set which includes an ink composition containing resin particles and a pigment, and a process liquid containing an organic acidic compound including a compound represented by General Formula (I) is provided.

$$C_nH_{2n+2-m}(COOH)_m \qquad \text{General Formula (I)}$$

[In General Formula (I), n represents an integer of greater than or equal to 2 and m represents an integer of greater than or equal to 3.]

<2> The ink set according to <1>, wherein the content of the compound represented by General Formula (I) in the organic acidic compound is 5 mass % to 30 mass %.

<3> The ink set according to <1> or <2>, wherein the process liquid further includes at least one of phosphoric acid and a phosphoric acid compound.

<4> The ink set according to any one of <1> to <3>, wherein the process liquid further includes at least one of phosphoric acid and a phosphoric acid compound, and the content of the organic acidic compound with regard to a total sum of the organic acidic compound and the phosphoric acid and the phosphoric acid compound is 60 mass % to 90 mass %.

<5> The ink set according to any one of <1> to <4>, wherein n is an integer of 3 to 5.

<6> The ink set according to any one of <1> to <5>, wherein the compound represented by General Formula (I) is at least one selected from the group consisting of 1,2,3-propanetricarboxylic acid, 1,3,5-pentanetricarboxylic acid, and 1,2,3,4-butanetetracarboxylic acid.

<7> The ink set according to any one of <1> to <6>, wherein the organic acidic compound further includes a compound containing two carboxyl groups within one molecule.

<8> The ink set according to <7>, wherein the compound containing two carboxyl groups within one molecule is at least one selected from the group consisting of DL-malic acid, malonic acid, glutaric acid, dimethylmalonic acid, and maleic acid.

<9> The ink set according to any one of <1> to <8>, wherein the content of the compound represented by General Formula (I) with regard to a total amount of the process liquid is 0.5 mass % to 10 mass %.

<10> The ink set according to any one of <1> to <9>, wherein the resin particles are self-dispersing resin particles.

<11> The ink set according to <10>, wherein the self-dispersing particles include a polymer having a carboxyl group and with an acid value of 25 to 100 mgKOH/g.

<12> There is provided an image forming method using the ink set according to any one of <1> to <11>, which includes a process liquid applying step for applying the process liquid on a recording medium and an ink applying step for applying the ink composition is applied on the recording medium.

<13> The image forming method according to <12>, which further includes a heat fixing step for fixing the image formed from the process liquid applying step and the ink applying step by heat.

<14> The image forming method according to <12> or <13>, wherein the recording medium has a coat layer containing calcium carbonate.

According to the present invention, the ink set and the image forming method being capable of forming the image with suppressed roughness can be provided.

DESCRIPTION OF THE PREFERRED EMBODIMENTS

Hereinafter, an ink set and an image forming method of the present invention is described in detail.

<<Ink Set>>

An ink set of the present invention includes an ink composition (hereinafter, simply refer to as "ink") and a process liquid containing an organic acidic compound including a compound represented by following General Formula (I).

$$C_nH_{2n+2-m}(COOH)_m \quad \text{General Formula (I)}$$

[In General Formula (I), n represents an integer of greater than or equal to 2 and m represents an integer of greater than or equal to 3.]

When an image is formed using a conventional ink set, there may be cases in which the image formed becomes rough. As one reason for the image roughness, it may be considered that, due to lack of an aggregating property, the location of an ink drop is dislocated from a target location by movement of the ink drop (an ink dot) ejected on the recording medium, joining up of the ink drops themselves and the like.

Therefore, by using an ink set as the composition of the present invention, image roughness is suppressed. This effect is considered to be such that, due to a combination of the resin particles contained in the ink and the compound represented by General Formula (I) (an alkane polycarboxylic acid having greater than or equal to 3 carboxyl groups) contained in the process liquid, a high enough aggregating property may be obtained to suppress the movement of ink drops and the accompanying image roughness.

Conventionally, there have been cases in which an organic carboxylic acid having greater than or equal to divalency was contained in the process liquid, however, if only the organic carboxylic acid having greater than or equal to divalency other than the compound represented by General Formula (I) (an organic carboxylic acid having divalency or an organic carboxylic acid having greater than or equal to trivalency having a substituent other than a carboxyl group (for example, citric acid)) is used, an aggregating property of the ink set of the present invention cannot be obtained. Also, even when the compound represented by General Formula (I) is used, an aggregating property of the ink set of the present invention cannot be obtained if the resin particles are not included in the ink.

Hereinafter, the process liquid and the ink composition in the ink set of the present invention is described.

<Process Liquid>

The process liquid according to the present invention contains an organic acidic compound including a compound represented by following General Formula (I).

That is, the process liquid may include, as the organic acidic compound, the compound represented by the General Formula (I) only, or include the compound represented by the General Formula (I) and a compound besides the compound represented by the General Formula (I) as the organic acid.

Also, the process liquid may include only one type of the compounds represented by General Formula (I) or include greater than or equal to two types.

(Compound Represented by General Formula (I))

Hereinafter, the compound represented by General Formula (I) according to the present invention is described.

$$C_nH_{2n+2-m}(COOH)_m \quad \text{General Formula (I)}$$

[In General Formula (I), n represents an integer of greater than or equal to 2 and m represents an integer of greater than or equal to 3.]

In the present invention, the compound represented by General Formula (I) restricts movement of an ink drop by aggregating resin particles contained in the ink.

In General Formula (I), it is preferable that n be an integer of 3 to 5. If n is greater than or equal to 3, image roughness is further suppressed. If n is less than or equal to 5, scratch resistance (physical strength of the image; hereinafter, the same) of the image is further improved.

Also, in General Formula (I), it is preferable that m be an integer of 3 to 5. If m is greater than or equal to 3, image roughness is further suppressed. If m is less than or equal to 5, scratch resistance of the image is further improved.

Specific examples of the compound represented by General Formula (I) may include 1,2,3-propanetricarboxylic acid, 1,3,5-pentanetricarboxylic acid, 1,2,3,4-butanetetracarboxylic acid or the like.

(Other Organic Acidic Compound)

The process liquid may contain other organic acidic compounds besides the compound represented by General Formula (I). By the process liquid containing other organic acidic compounds improve the scratch resistance of the image.

As other organic acidic compounds, for example, at least one type of polyvalent organic acid besides the compound represented by General Formula (I) may be used.

As the polyvalent organic acids, a compound containing two carboxyl groups within one molecule is preferable.

As the compound containing two carboxyl groups within one molecule, tartaric acid, phthalic acid, 4-methylphthalic acid, DL-malic acid, malonic acid, glutaric acid, dimethylmalonic acid, or maleic acid is preferable, and DL-malic acid, malonic acid, glutaric acid, dimethylmalonic acid, or maleic acid is more preferable. These may be used either alone or as a combination of two or more.

In the present invention, while the content of the compound represented by General Formula (I) (total content) in all organic acidic compounds contained in the process liquid is not particularly limited, the content of 5 mass % to 30 mass % is preferable with regard to the total amount of the process liquid. If the content is greater than or equal to 5 mass %, image roughness is further suppressed, and if the content is less than or equal to 30 mass %, scratch resistance of the image is further improved.

Also, in the present invention, while the content of the compound represented by General Formula (I) (total content) in the total amount of the process liquid is not particularly limited, the content of 0.5 mass % to 25 mass % is preferable, 0.5 mass % to 20 mass % is more preferable, 0.5 mass % to 15 mass % is even more preferable, and 0.5 mass % to 10 mass % is particularly preferable with regard to the total amount of the process liquid. If the content is greater than or equal to 0.5 mass %, image roughness is further suppressed, and if the content is less than or equal to 25 mass %, scratch resistance of the image is further improved.

Also, in the present invention, while the content of all organic acidic compounds (including the compound represented by General Formula (I)) contained in the process liquid is not particularly limited, from the viewpoint of the aggregating property of the ink and suppression of the image roughness, the content of 0.5 mass % to 25 mass % is preferable, 5 mass % to 25 mass % is more preferable, and 10 mass % to 20 mass % is particularly preferable with regard to the total amount of the process liquid.

(Phosphoric Acid and Phosphoric Acid Compound)

The process liquid according to the present invention may include at least one of phosphoric acid and a phosphoric acid compound as an inorganic acid. As a result, an uneven brightness of the image is suppressed. The uneven brightness of the image is considered to come from a reaction of an ingredient in the recording medium (for example, calcium carbonate) with the organic acidic compound in the process liquid.

As the phosphoric acid compound, for example, phosphorous acid, hypophosphorous acid, pyrophosphoric acid, metaphosphoric acid, polyphosphoric acid or salts thereof may be used.

In the process liquid according to the present invention, the content of the organic acidic compound (all organic acidic compounds including the compound represented by General Formula (I)) with regard to the total sum of the organic acidic compounds (all organic acidic compounds including the compound represented by General Formula (I)) and the phosphoric acid and phosphoric acid compound is not particularly limited, however, 60 mass % to 90 mass % is preferable. If the content is greater than or equal to 60 mass %, image roughness is further suppressed, and if the content is less than or equal to 90 mass %, scratch resistance of the image is further improved since uneven brightness of the image is further suppressed.

(Water)

It is preferable that water be contained in the process liquid according to the present invention. As the content of water, while not particularly limited, 10 to 99 mass % is preferable, 50 to 90 mass % is more preferable, and 60 to 80 mass % is even more preferable.

(Organic Solvent)

According to the present invention, it is preferable that the process liquid include at least one type selected from a group of organic solvents.

As the organic solvent, an organic solvent of which greater than or equal to 5 g dissolves in 100 g water at 20° C. (hereinafter, refer to "water-soluble organic solvent") is preferable.

As the water-soluble organic solvent, the same as the water-soluble organic solvent contained in an ink described later may be used. Among these, from the viewpoint of curl suppression, polyalkylene glycol or a derivative thereof is preferable, and at least one type selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

As the content in the process liquid of the organic solvent, while not particularly limited, however from the viewpoint of curl suppression, 1 to 30 mass % is preferable and 5 to 15 mass % is more preferable with regard to the total amount of the process liquid.

(Water-soluble Polymer)

In the process liquid according to the present invention, it is preferable that at least one type of water-soluble polymer be contained.

As a result, the aggregation rate is suppressed to some extent and the size of the ink drop applied on the recording medium can be spread to a target size. As a result, decrease in the image uniformity due to the lack of ink spread or the image roughness may be suppressed.

Here, water-soluble means that more than certain concentration can be achieved by dissolution in water, and a polymer which can be dissolved in aqueous process liquid (preferably uniformly) may be used. Specifically, solubility of greater than or equal to 5 mass % in water at 25° C. is preferable and greater than or equal to 10 mass % is more preferable.

As the water-soluble polymer, a polymer compound which includes a structural unit having an ionic group (preferably an anionic group) is preferable. As a result, spread of the ink drops applied on the recording medium is accelerated, therefore, the image uniformity is further improved and the image roughness is further suppressed.

Here, as the ionic group, a carboxyl group, a sulfonate group, a phosphate group, a boronate group, an amino group, an ammonium group, or salts thereof may be included. Among these, a carboxyl group, a sulfonate group, a phosphate group or salts thereof is preferable, a carboxyl group, a sulfonate group or salts thereof is more preferable, and a sulfonate group or a salt thereof is even more preferable.

As the content of the structural unit having an ionic group (preferably an anionic group) in the water-soluble polymer, out of total mass of the water-soluble polymer, for example, 10 to 100 mass % is possible, 10 to 90 mass % is preferable, 10 to 70 mass % is more preferable, 10 to 50 mass % is even more preferable, and 20 to 40 mass % is particularly preferable.

As a weight-average molecular weight of the water-soluble polymer, while not particularly limited, for example, 10,000 to 100,000 is possible, 20,000 to 80,000 is preferable, and 30,000 to 80,000 is more preferable.

As the content of the water-soluble polymer in the process liquid according to the present invention, while not particularly limited, 0.1 mass % to 10 mass % is preferable, 0.1 mass % to 4 mass % is more preferable with regard to the total amount of the process liquid.

If the content is greater than or equal to 0.1 mass %, spread of the ink drops may be further accelerated, and if the content is less than or equal to 10 mass %, the thickening of the process liquid may be further suppressed.

(Nitrogen-containing Heterocyclic Compound and Organic Mercapto Compound)

The process liquid according to the present invention may contain at least one type selected from a nitrogen containing heterocyclic compound and an organic mercapto compound. As a result, scratch resistance of the image and transportability of the recording medium are improved. Between the two, containing the nitrogen-containing heterocyclic compound is preferable.

—Nitrogen-Containing Heterocyclic Compound—

As a structure of the nitrogen-containing heterocyclic compound, a nitrogen-containing five-membered ring structure or a six-membered ring structure is preferable, and between the two, the nitrogen-containing five-membered ring structure is preferable.

Among the nitrogen-containing five-membered ring structure or the nitrogen-containing six-membered ring structure, the five- or six-membered heterocyclic ring structure having at least one type from a carbon atom, a nitrogen atom, an oxygen atom, a sulfur atom and a selenium atom is preferable. Also, this heterocyclic ring may be condensed with an aromatic hydrocarbon or an aromatic heterocyclic ring.

As the heterocyclic ring, for example, a tetrazole ring, a triazole ring, an imidazole ring, a thiadiazole ring, an oxadiazole ring, a selenadiazole ring, an oxazole ring, a thiazole ring, a benzoxazole ring, a benzthiazole ring, a benzimidazole ring, a pyrimidine ring, a triazaindene ring, a tetrazaindene ring, a pentazaindene ring or the like may be included.

These rings may have substituents, and the substituent may be substituted with a nitro group, a halogen atom (for example, a chlorine atom or a bromine atom), a mercapto group, a cyano group, a substituted or unsubstituted alkyl group, respectively (for example, each group of methyl, ethyl, propyl, t-butyl, or cyanoethyl), an aryl group (for example, each group of phenyl, 4-methanesulfonamide phenyl, 4-methylphenyl, 3,4-dichlorophenyl, or naphthyl), an alkenyl group (for example, an allyl group), an aralkyl group (for example, each group of benzyl, 4-methylbenzyl, or phenethyl), a sulfonyl group (for example, each group of methanesulfonyl, ethanesulfonyl, or p-toluenesulfonyl), a carbamoyl group (for example, each group of unsubstituted carbamoyl, methylcarbamoyl, or phenylcarbamoyl), a sulfamoyl group (for example, each group of unsubstituted sulfamoyl, methylsulfamoyl, or phenylsulfamoyl), a carbonamide group (for example, each group of acetamide or benzamide), a sulfonamide group (for example, each group of methanesulfonamide, benzenesulfonamide, or p-toluenesulfonamide), an acyloxy group (for example, each group of acetyloxy or benzoyloxy), a sulfonyloxy group (for example, methanesulfonyloxy), an ureide group (for example, each group of unsubstituted ureide, methylureide, ethylureide, or phenylureide), an acyl group (for example, each group of acetyl or benzoyl), an oxycarbonyl group (for example, methoxycarbonyl or phenoxycarbonyl), an oxycarbonylamino group (for example, each group of methoxycarbonyl amino, phenoxycarbonyl amino, 2-ethyl hexyl oxycarbonyl amino), a hydroxyl group or the like. The substituent may be multiply substituted in one ring.

Specific examples of the preferable nitrogen-containing heterocyclic compound are as follows.

That is, imidazole, benzimidazole, benzindazole, benzotriazole, tetrazole, benzoxazole, benzothiazole, pyridine, quinoline, pyrimidine, piperidine, piperazine, quinoxaline, morpholine or the like may be included and these may have substituents such as an alkyl group, a carboxyl group, or a sulfo group described above.

As the preferable nitrogen-containing six-membered ring compound, a triazine ring, a pyrimidine ring, a pyridine ring, a pyrroline ring, a piperidine ring, a pyridazine ring, or a pyrazine ring is included, and among these, a compound having a triazine ring or a pyrimidine ring is preferable. These nitrogen-containing six-membered ring compounds may have a substituent and as a substituent in that case, an alkyl group having a carbon number of 1 to 6, more preferably 1 to 3, an alkoxy group having a carbon number of 1 to 6, more preferably 1 to 3, a hydroxyl group, a carboxyl group, a mercapto group, an alkoxyalkyl group having a carbon number of 1 to 6, more preferably 1 to 3, or a hydroxyalkyl group having a carbon number of 1 to 6, more preferably 1 to 3 may be included.

Specific examples of the preferable nitrogen-containing six-membered ring compound may include triazine, methyltriazine, dimethyltriazine, hydroxyethyltriazine ring, pyrimidine, 4-methylpyrimidine, pyridine, or pyrroline.

—Organic Mercapto Compound—

As the organic mercapto compound, an alkylmercapto compound, an arylmercapto compound, or a heterocyclic mercapto compound may be included.

As the alkylmercapto compound, cysteine, thiomalic acid or the like may be included, as an arylmercapto compound, thiosalicylic acid or the like may be included, and as a heterocyclic mercapto compound, 2-phenyl-1-niercaptotetrazole, 2-mercaptobenzimidazole, 2-mercaptobenzothiazole, 2-mercaptobenzoxazole, 2-mercaptopyrimidine, 2,4-dimercaptopyrimidine, 2-mercaptopyridine or the like may be included. These may have a substituent such as an alkyl group, a carboxyl group, or a sulfo group.

Among the nitrogen-containing heterocyclic compounds and the organic mercapto compounds, benzotriazole, 5-methylbenzotriazole, 5-aminobenzotriazole, 5-chlorobenzotriazole, tetrazole, 5-aminotetrazole, 5-methyltetrazole, or 5-phenyltriazole is particularly preferable and benzotriazole is the most preferable.

The nitrogen-containing heterocyclic compound and the organic mercapto compound may be used either alone or a combination of two or more.

The content of the nitrogen-containing heterocyclic compound and the organic mercapto compound in the process liquid (the total content) is not particularly limited, however, with regard to the total amount of the process liquid, 0.1 to 5.0 mass % is preferable and 0.1 to 3.0 mass % is more preferable.

(Surfactant)

The process liquid according to the present invention may contain at least one type of surfactant. The surfactant may be used as a surface tension adjusting agent. As the surface tension adjusting agent, a nonionic surfactant, a cationic surfactant, an anionic surfactant, or a betaine surfactant may be included.

Among these, from the viewpoint of an aggregation rate of the ink composition, a nonionic surfactant or an anionic surfactant is preferable.

As specific examples of the surfactant, in a hydrocarbon series, an anionic surfactant such as fatty acid salt, alkyl sulfate, alkyl benzenesulfonate, alkyl naphthalenesulfonate, dialkyl sulfosuccinate, alkyl phosphate, naphthalenesulfonate formalin condensate, or polyoxyethylene alkyl sulfate, or a nonionic surfactant such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerin fatty acid ester, or oxyethylene oxypropylene block copolymer is preferable. Also, SURFYNOLS (Air Products and Chemicals, Inc.), an acetylene-based polyoxyethylene oxide surfactant, is preferably used. Also, an amine oxide type amphoteric surfactant such as N,N-dimethyl-N-alkylamine oxide, or the like, is preferable.

Also, surfactants disclosed in pages (37) to (38) of JP1984-157636A (JP-S59-157636A), and Research Disclosure No. 308119 (1989) may be used.

Also, fluorine-based surfactants (alkyl fluoride-based) or silicon-based surfactants disclosed in each of JP2003-322926A, JP2004-325707A, and JP2004-309806A may be used.

As the content of the surfactant in the process liquid, while not particularly limited, the content through which the surface tension of the process liquid becomes greater than or equal to 40 mN/m is preferable, the content through which the surface tension becomes 40 to 60 mN/m is more preferable that, and the content through which the surface tension becomes 42 to 50 mN/m is even more preferable.

(Other Aggregating Ingredients)

The process liquid according to the present invention, as long as it does not impair the effect of the present invention, may include other aggregating components in addition to the organic acidic compound including the compound represented by General Formula (I) described above. As other aggregating agents, a polyvalent metal salt, polyallylamine or the like may be included.

As the polyvalent metal salt, an alkaline earth metal in group 2 of the periodic table (for example, magnesium or calcium), a transition metal in group 3 of the periodic table (for example, lanthanum), a cation from group 13 of the periodic table (for example, aluminum), a salt of lanthanides (for example neodymium), and a polyallylamine or a polyallylamine derivative may be included. As a salt of the metal, a carboxylate (formic acid, acetic acid, benzoic acid or the like), a nitrate, a chloride, and a thiocyanate are suitable. Among these, a calcium salt or a magnesium salt of a carboxylic acid (formic acid, acetic acid, benzoic acid or the like), a calcium salt or a magnesium salt of nitric acid, calcium chloride, magnesium chloride, and a calcium salt or magnesium salt of thiocyanic acid are preferable.

As the content in the process liquid of the polyvalent metal salt, for example, 1 to 10 mass % is possible.

—Other Additives—

The process liquid according to the present invention may be composed to include other additives in addition to the above ingredients. Other additives in the process liquid are the same as other additives in an ink composition described later.

A surface tension of the process liquid is not particularly limited, and can be greater than or equal to 40 mN/m. In particular, from the viewpoint of curl suppression of the recording medium, 40 to 60 mN/m is preferable, 42 to 50 mN/m is more preferable, and 42 to 47 mN/m is even more preferable.

The surface tension of the process liquid may be adjusted by adding, for example, a surfactant. Also, the surface tension of the process liquid is measured by the plate method at 25° C. using an Automatic Surface Tensiometer CBVP-Z (manufactured by Kyowa Interface Science Co., Ltd.).

Also, the process liquid according to the present invention, from the viewpoint of aggregation rate of the ink composition, has a pH (25° C.±1° C.) of preferably less than or equal toless than or equal to 3.5, more preferably 0.5 to 2.5, and even more preferably 0.5 to 2.0.

Also, the process liquid, from the viewpoint of aggregation rate of the ink composition, has a viscosity preferably in a range of 1 to 30 mPa·s, more preferably in a range of 1 to 20 mPa·s, even more preferably in a range of 2 to 15 mPa·s, and particularly preferably in a range of 2 to 10 mPa·s. Also the viscosity is measured at 25° C. using a VISCOMETER TV-22 (manufactured by TOKI SANGYO CO., LTD.).

<Ink Composition>

An ink composition according to the present invention contains resin particles and a pigment.

The ink composition includes a pigment dispersing agent (a polymer dispersing agent), an organic solvent, a neutralizing agent, water, and other ingredients as necessary.

(Pigment)

The ink composition according to the present invention contains at least one type of pigment.

The type of the pigment is not particularly limited and conventional well-known organic or inorganic pigments may be used. For example, a polycyclic pigment such as an azo lake, an azo pigment, a phthalocyanine pigment, a perylene and a perinone pigment, an anthraquinone pigment, a quinacridone pigment, a dioxazine pigment, a diketopyrrolepyrrole pigment, a thioindigo pigment, an isoindolinone pigment, or a quinophthalone pigment, a dye lake such as a basic dye type lake or an acidic dye type lake, an organic pigment such as a nitro pigment, a nitroso pigment, an aniline black, or a daylight fluorescent pigment, or an inorganic pigment such as titanium oxide, an iron oxide series, or a carbon black series may be included. Also, even pigments not listed in the color index may all be used if dispersible in aqueous phase. In addition, a pigment surface-treated with a surfactant, a polymer dispersing agent or the like, or grafting carbon or the like may be used.

Among these pigments, in particular, an azo pigment, a phthalocyanine pigment, an anthraquinone pigment, a quinacridone pigment or a carbon black-based pigment is preferable.

—Dispersing Agent—

In the ink composition according to the present invention, a form in which the pigment is dispersed by a dispersing agent is preferable.

Also, of the forms, the form in which the pigment is dispersed by a polymer dispersing agent, that is, the form in which at least a part of the pigment is coated with the polymer dispersing agent is particularly preferable. The pigment at least a part of which is coated with the polymer dispersing agent is also referred to as "resin coated pigment".

As the dispersing agent, a polymer dispersing agent or a low-molecular surfactant type dispersing agent may be used. Also, as the polymer dispersing agent, both water-soluble polymer dispersing agents or non-water-soluble polymer dispersing agents may be used.

As the low-molecular surfactant type dispersing agent, surfactant type dispersing agents disclosed in paragraphs 0016 to 0020 of JP2010-188661A may be used.

As a water-soluble polymer dispersing agent of the polymer dispersing agents, a hydrophilic polymer compound may be used.

As the water-soluble polymer dispersing agent, for example, natural hydrophilic polymer compounds disclosed in paragraphs 0021 to 0022 of JP2010-188661A may be used.

Also, as the water-soluble polymer dispersing agent, a synthetic hydrophilic polymer compound may be used.

As the synthetic hydrophilic polymer compound, a vinyl-based polymer such as polyvinyl alcohol, polyvinyl pyrrolidone, or polyvinyl methyl ether, an acryl-based resin such as polyacrylamide, polyacrylic acid or an alkali metal salt thereof, or a water-soluble styrene acrylic resin, a water-soluble styrene maleic acid resin, a water-soluble vinylnaphthalene acrylic resin, a water-soluble vinylnaphthalene maleic acid resin, an alkali metal salt of polyvinyl pyrrolidone, polyvinyl alcohol, or β-naphthalenesulfonic acid formalin condensate, a polymer compound having a salt of cationic functional group such as a quaternary ammonium or an amino group at a side chain or the like may be included.

Among these, from the viewpoint of dispersing stability of the pigment and aggregating property, a polymer compound containing a carboxyl group is preferable and, a polymer compound containing a carboxylic group such as, for example, an acrylic resin such as a water-soluble styrene acrylic resin, a water-soluble styrene maleic acid resin, a water-soluble vinylnaphthalene acrylic resin, or a water-soluble vinylnaphthalene maleic acid resin is particularly preferable.

As a non-water-soluble dispersing agent of the polymer dispersing agents, a polymer having both a hydrophilic unit and a hydrophobic unit may be used. For example, a styrene-(meth)acrylic acid copolymer, a styrene-(meth)acrylic acid-(meth)acrylate copolymer, a (meth)acrylate-(meth)acrylic acid copolymer, a polyethylene glycol(meth)acrylate-(meth) acrylic acid copolymer, a styrene maleic acid copolymer or the like may be included.

The styrene-(meth)acrylic acid copolymer, the (meth)acrylate-(meth)acrylic acid copolymer, the polyethylene glycol (meth)acrylate-(meth)acrylic acid copolymer, and the styrene-maleic acid copolymer may be a binary copolymer or an greater than or equal to ternary copolymer.

As the polymer dispersing agent, among these, the (meth) acrylate-(meth)acrylic acid copolymer is preferable and a ternary copolymer of benzyl(meth)acrylate-(meth)acrylic acid-methyl(meth)acrylate is particularly preferable.

Here, (meth)acrylic acid represents acrylic acid or methacrylic acid and (meth)acrylate represents acrylate or methacrylate.

As a weight-average molecular weight of the polymer dispersing agent, 3,000 to 200,000 is preferable, 5,000 to 100,000 is more preferable, 5,000 to 80,000 is even more preferable, and 10,000 to 60,000 is particularly preferable.

An acid value of the polymer dispersing agent is not particularly limited, however, from the viewpoint of aggregating property, it is preferable that an acid value of the polymer dispersing agent be larger than that of resin particles (preferably a self-dispersing resin particle) described later.

Also, in the ink composition according to the present invention, as a mass ratio of the pigment and the dispersing agent (pigment:dispersing agent), a range of 1:0.06 to 1:3 is preferable, a range of 1:0.125 to 1:2 is more preferable, and a range of 1:0.125 to 1:1.5 is even more preferable.

As an average particle diameter of the pigment (an average particle diameter of the resin coated pigment in case that the resin coated pigment is used; hereinafter, the same), 10 to 200 nm is preferable, 10 to 150 nm is more preferable, and 10 to 100 nm is even more preferable. If the average particle diameter is less than or equal to 200 nm, color reproducibility becomes favorable, therefore, ejecting characteristics when ejected by an ink jet method become favorable and if greater than or equal to 10 nm, light resistance becomes favorable. Also, a particle size distribution of the pigment is not particularly limited and any of a wide particle size distribution or a mono-dispersing particle size distribution can be used. Also, a color material having a mono-dispersing particle size distribution may be used in a combination of two or more.

Also, the average particle diameter and the particle size distribution of the pigment is determined from measuring the volume average particle diameter by a dynamic light scattering method using a UPA-EX150 (manufactured by Nikkiso Co., Ltd.), a nano track particle size distribution measuring device.

In the present invention, as the content of the pigment in the ink composition, from the viewpoint of an image concentration, 1 to 25 mass % is preferable, 2 to 20 mass % is more preferable, and 2 to 10 mass % is particularly preferable with regard to the total amount of the ink composition. The pigment may be used either alone or as a combination of two or more.

(Resin Particles)

The ink composition according to the present invention includes at least one type of resin particle.

The resin particles, unlike the polymer dispersing agent described above (the polymer dispersing agent which covers at least part of the pigment), are particles which exist independent of the pigment.

From the fact that the ink composition contains the resin particles, fixability to a recording medium or scratch resistance of the image formed of the ink composition is improved.

Also, the resin particles are aggregated by the compound represented by General Formula (I) in the process liquid described above. As a result, the movement of ink drops on the recording medium is suppressed and image roughness is suppressed.

As the resin particles, non-water-soluble, or poorly water-soluble resin particles are preferable.

Here, "non-water-soluble or poorly water-soluble" means that when 20 g of resin is dried for 2 hours at 105° C. and then dissolved in 100 g of water at 25° C., the dissolved amount is less than or equal to 15 g. From the viewpoint of an improvement of continuous discharge and discharging stability of the ink, the dissolved amount is preferably less than or equal to 10 g, more preferably less than or equal to 5 g, and even more preferably less than or equal to 1 g. The dissolved amount is, depending on the type of a salt-forming group of the non-water-soluble or poorly water-soluble resin particles, an amount when 100% neutralized with sodium hydroxide or acetic acid.

As the resin particles, for example, a thermoplastic, a thermohardening, or a denaturalizing acrylic-based, epoxy-based, polyurethane-based, polyether-based, polyamide-based, unsaturated polyester-based, phenol-based, silicon-based, or fluorine-based resin, a polyvinyl-based resin such as vinyl chloride, vinyl acetate, polyvinyl alcohol or polyvinyl butyral, a polyester-based resin such as an alkyd resin, a phthalic acid resin, an amino-based material such as a melamine resin, a melamine formaldehyde resin, an amino alkyd coconsensation resin, or a urea resin, or copolymers thereof or resin particles having an anionic group such as a mixture may be included. Of these, an anionic acrylic resin may be obtained by polymerizing, for example, an acrylic monomer (an anionic group containing acrylic monomer) and, if necessary, other monomers which can be copolymerized with the anionic group containing acrylic monomer in, a solvent. As the anionic group containing acrylic monomer, for example, one or more acrylic monomer selected from the group consisting of a carboxyl group, a sulfonate group, and a phosphono group may be included. Among these, an acrylic monomer having a carboxyl group (for example, acrylic acid, methacrylic acid, crotonic acid, ethacrylic acid, propylacrylic acid, iso-propylacrylic acid, itaconic acid, fumaric acid or the like) is preferable and acrylic acid or methacrylic acid is particularly preferable.

As the resin particles according to the present invention, from the viewpoint of discharging stability and liquid stability of the system including the pigment (particularly dispersion stability), particles of a self-dispersing resin (self-dispersing resin particles) are preferable. Here, a self-dispersing resin means a non-water-soluble polymer, which can be in a state of dispersion in an aqueous medium due to a functional group of the polymer itself (an acidic group or a salt thereof, in particular) when, in the absence of a surfactant, dispersed by a phase inversion emulsification method.

Here, the state of dispersion includes both an emulsion state in which the non-water-soluble polymer is dispersed in a liquid state in an aqueous medium (an emulsion) and a dispersion state in which the non-water-soluble polymer is dispersed in a solid state in an aqueous medium (a suspension).

Also, the aqueous medium represents a medium including water. The aqueous medium may include a hydrophilic organic solvent if necessary. It is preferable that the aqueous medium be made up of water containing less than or equal to 0.2 mass % of hydrophilic organic solvent with regard to water and more preferable that it be made up of water.

As the self-dispersing resin, from a view point of an aggregation rate and fixability when contained in the ink composition, self-dispersing resin particles in a state of dispersion, in which the non-water-soluble polymer is dispersed in a solid state, is preferable.

As a method in which an emulsion or a dispersion state of self-dispersing resin is obtained, that is, as a preparation method of an aqueous dispersed substance of the self-dispersing resin particles, a phase inversion emulsification method may be used.

As the phase inversion emulsification method, for example, a method may be used in which the self-dispersing resin is dissolved or dispersed in a solvent (for example, a water-soluble organic solvent), then is put into water without adding a surfactant, and, as in a state where a salt-forming group (for example, an acidic group) contained in the self-dispersing resin is neutralized, the mixture is stirred, mixed, and after the solvent is removed, an aqueous dispersed substance in an emulsion or a dispersion state is obtained.

Also, a stable emulsion or dispersion state in the self-dispersing resin means that, after a solution in which 30 g of a non-water-soluble polymer is dissolved in 70 g of an organic solvent (for example, methyl ethyl ketone), neutralizing agent which enables the salt-forming group of the non-water-soluble polymer to be 100% neutralized (sodium hydroxide if the salt-forming group, is anionic and acetic acid if cationic), and water are mixed and stirred (device: a stirring device with a stirring blade, revolutions of 200 rpm, for 30 minutes, 25° C.), an emulsion or a dispersion state is in a stable state for at least one week at 25° C. even after the organic solvent is removed from the mixture (that is, a state in which a precipitation cannot be confirmed visually).

Also, a stability of an emulsion or a dispersion state in the self-dispersing resin may be also confirmed by an acceleration test of sedimentation from centrifugation. The stability by an acceleration test of sedimentation from centrifugation may be evaluated by, for example, by the aqueous dispersed substance of the resin particles obtained by the method above being adjusted to a solid concentration of 25 mass %, then centrifuging for one hour at 12,000 rpm and measuring the solid concentration in the supernatant after centrifugation.

If the ratio of the solid concentration after centrifugation to the solid concentration before centrifugation is large (a numerical value closer to 1), this means that no sedimentation of the resin particles has occurred from centrifugation, that is, the aqueous dispersed substance of the resin particles is more stable. In the present invention, the ratio of the solid concentration before and after centrifugation being greater than or equal to 0.8 is preferable, greater than or equal to 0.9 is more preferable, and greater than or equal to 0.95 is particularly preferable.

In the self-dispersing resin, it is preferable that the content of a water-soluble component which represents water-solubility in a dispersion state be less than or equal to 10 mass %, more preferable that it be less than or equal to 8 mass %, and even more preferable that it be less than or equal to 10 mass %. Making a water-soluble component less than or equal to 10 mass % effectively suppresses swelling of the resin particles or fusion among the resin particles and a more stable dispersion state can be maintained. Also, a viscosity increase of the aqueous ink composition may be suppressed and, for example, discharge stability is more favorable in case that the aqueous ink composition is applied to an ink jet method.

Here, a water-soluble component is a compound contained in the self-dispersing resin and a compound dissolved in water when the self-dispersing resin is in a dispersion state. The water-soluble component is a water-soluble compound formed as a byproduct or a contamination in the self-dispersing resin preparation.

As a main chain skeleton of the non-water-soluble polymer, while not particularly limited, for example, a vinyl polymer, a condensed polymer (an epoxy resin, polyester, polyurethane, polyamide, cellulose, polyether, polyurea, polyimide, polycarbonate or the like) may be used. Among these, vinyl polymer is particularly preferable.

As suitable examples of a vinyl polymer and a monomer composing a vinyl polymer, examples disclosed in JP2001-181549A and JP2002-88294A may be included. Also, a chain transfer agent or a polymerization initiator having a dissociative group (or a substituent which can be derived from a dissociative group), or a vinyl polymer introducing a dissociative group at the end of the polymer chain due to radical polymerization of a vinyl monomer using an iniferter or by ion polymerization using a compound having a dissociative group (or a substituent which can be induced from a dissociative group) somewhere in an initiator or a terminating agent may be used.

Also, as suitable examples of a condensed polymer and a monomer composing a condensed polymer, examples disclosed in JP2001-247787A may be included.

As the self-dispersing resin particles according to the present invention, from the viewpoint of a self-dispersing property, a non-water-soluble polymer including a hydrophilic structural unit and a structural unit derived from an aromatic group containing monomer or a cyclic aliphatic group containing monomer is preferable.

The "hydrophilic structural unit" is not particularly limited as long as it is derived from a hydrophilic group containing monomer, and it may be derived either from one type of hydrophilic group containing monomer or from greater than or equal to two types of hydrophilic group containing monomers. The hydrophilic group is not particularly limited and may be either a dissociative group or a nonionic hydrophilic group.

As the hydrophilic group, from the viewpoint of self-dispersion promotion and stability of emulsion or dispersion state formed, a dissociated group is preferable, and an anionic dissociative group is more preferable. As the dissociative group, a carboxyl group, a phosphate group, a sulfonate group or the like may be included, and among these, from the viewpoint of fixability when composing the ink composition, a carboxylic group is preferable.

The hydrophilic group containing monomer, from the viewpoint of a self-dispersing property and an aggregating property, a dissociative group containing monomer is preferable and a dissociative group containing monomer having an ethylenic unsaturated bond with a dissociative group is preferable.

As the dissociative group containing monomer, for example, an unsaturated carboxylic acid monomer, an unsaturated sulfonic acid monomer, or an unsaturated phosphoric acid monomer may be included.

As the unsaturated carboxylic acid monomer, specifically, acrylic acid, methacrylic acid, crotonic acid, itaconic acid, maleic acid, fumaric acid, citraconic acid, or 2-methacryloyloxymethylsuccinic acid may be included.

As the unsaturated sulfonic acid monomer, specifically, styrene sulfonic acid, 2-acrylamide-2-methylpropane sulfonic acid, 3-sulfopropyl (meth)acrylate, bis-(3-sulfopropyl)-itaconate or the like may be included.

As the unsaturated phosphoric acid monomer, specifically, vinylphosphonic acid, vinyl phosphate, bis(methacryl oxyethyl)phosphate, diphenyl-2-acryloyloxyethylphosphate, diphenyl-2-methacryloyloxyethylphosphate, dibutyl-2-acryloyloxyethylphosphate or the like may be included.

Among the dissociative group containing monomers, from the viewpoint of dispersion stability and discharge stability, an unsaturated carboxylic acid monomer is preferable, and acrylic acid and methacrylic acid are more preferable.

As the self-dispersing resin particles, from the viewpoint of a self-dispersing property and aggregation rate when in contact with the process liquid, containing a polymer having a carboxyl group is preferable, and containing a polymer having a carboxyl group and with an acid value of 25 to 100 mgKOH/g is more preferable. Also, as the acid value, from the viewpoint of a self-dispersing property and aggregation rate when in contact with the process liquid, 25 to 80 mgKOH/g is more preferable and 30 to 65 mgKOH/g is particularly preferable.

In particular, if the acid value is greater than or equal to 25, stability of self-dispersing property becomes favorable, and if less than or equal to 100, an aggregating property is improved.

The aromatic group containing monomer is not particularly limited as long as it is a compound containing an aromatic group and polymerizable group. The aromatic group may be either a group derived from aromatic hydrocarbon or from aromatic heterocyclic ring. In the present invention, from the viewpoint of particle forming stability in an aqueous medium, an aromatic group derived from aromatic hydrocarbon is preferable.

Also, the polymerizable group may be either a polymerizable group of polycondensation or a polymerizable group of polyaddition. In the present invention, from the viewpoint of particle forming stability in an aqueous medium, a polymerizable group of polyaddition is preferable and a group having an ethylenic unsaturated bond is more preferable.

As the aromatic group containing monomer, an aromatic group derived from aromatic hydrocarbon and a monomer having an ethylenic unsaturated bond is preferable. The aromatic group containing monomer may be used either alone or as a combination of two or more.

As the aromatic group containing monomer, for example, phenoxyethyl(meth)acrylate, benzyl(meth)acrylate, phenyl (meth)acrylate, a styrene-based monomer or the like may be included. Among these, from the viewpoint of a balance of hydrophilic property and hydrophobic property of a polymer chain and fixability of ink, an aromatic group containing (meth)acrylate monomer is preferable, at least one type selected from phenoxyethyl(meth)acrylate, benzyl(meth) acrylate, and phenyl(meth)acrylate is more preferable, and phenoxyethyl(meth)acrylate or benzyl(meth)acrylate is even more preferable.

Also, "(meth)acrylate" means acrylate or methacrylate.

As the cyclic aliphatic group containing monomer, a cyclic aliphatic group derived from a cyclic aliphatic hydrocarbon and a monomer having an ethylenic unsaturated bond is preferable and a cyclic aliphatic group containing (meth)acrylate monomer (hereinafter, sometimes referred to as alicyclic (meth)acrylate) is more preferable.

Alicyclic (meth)acrylate has a structure which includes a structural site derived from (meth)acrylate and a structural site derived from an alcohol and, in the structural site derived from alcohol, at least one unsubstituted or substituted alicyclic hydrocarbon group (cyclic aliphatic group) is contained. Also, the alicyclic hydrocarbon group, even a structural site derived from alcohol itself, may be bonded to the structural site derived from alcohol through a linking group.

The alicyclic hydrocarbon group is not particularly limited as long as it contains a cyclic non-aromatic hydrocarbon group, and a monocyclic hydrocarbon group, a bicyclic hydrocarbon group, a polycyclic hydrocarbon group of tricyclic or more hydrocarbon group may be included. As the alicyclic hydrocarbon group, for example, a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl; group, a perhydrofluorenyl group, a tricycle[$5.2.1.0^{2,6}$]decanyl group or bicycle[4.3.0]nonane may be included.

The alicyclic hydrocarbon group may further have a substituent. As the substituent, for example, an alkyl group, an alkenyl group, an aryl group, an aralkyl group, an alkoxy group, a hydroxyl group, a primary amino group, a secondary amino group, a tertiary amino group, an alkyl- or aryl carbonyl group, and a cyano group may be included. Also the alicyclic hydrocarbon group may further have a condensed ring. As the alicyclic hydrocarbon group according to the present invention, from the viewpoint of viscosity or solubility, it is preferable that the number of carbon atom of the alicyclic hydrocarbon group moiety be 5 to 20.

Specific examples of alicyclic (meth)acrylate are described below, however, the present invention is not limited to these examples.

As monocyclic (meth)acrylate, cycloalkyl(meth)acrylate having a cyclicalkyl group with a carbon number of 3 to 10 such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, or cyclodecyl(meth)acrylate may be included.

As a bicyclic (meth)acrylate, isobornyl(meth)acrylate, norbornyl(meth)acrylate or the like may be included.

As a tricyclic (meth)acrylate, adamantyl(meth)acrylate, dicyclopentanyl(meth)acrylate, dicyclopentenyl oxyethyl (meth)acrylate or the like may be included.

These may be used either alone or as a combination of two or more.

Among these, from the viewpoint of a dispersion stability of the self-dispersing resin particles, fixability, and blocking resistance, at least one type of bicyclic (meth)acrylate or tricyclic or more (meth)acrylate is preferable, and at least one type selected from isobornyl(meth)acrylate, adamantyl (meth)acrylate and di cyclopentanyl(meth)acrylate is more preferable.

As the self-dispersing resin, an acrylic resin containing a structural unit derived from a (meth)acrylate monomer is preferable, an acrylic resin containing a structural unit derived from an aromatic group containing (meth)acrylate monomer or alicyclic (meth)acrylate is preferable, and containing a structural unit derived from an aromatic group containing (meth)acrylate monomer or alicyclic (meth)acrylate and the content being 10 mass % to 95 mass % is more preferable. The content of the aromatic group containing (meth)acrylate monomer or alicyclic (meth)acrylate being 10 mass % to 95 mass % may improve the stability of self-emulsion or self-dispersion state and further suppress the viscosity increase of the ink.

From the viewpoint of stability of self-dispersion state, stabilization of a particle form by a hydrophobic interaction among aromatic rings or among alicyclic rings in the aqueous medium, and reduction of a water-soluble ingredient amount due to moderate hydrophobization of the particles, 15 mass % to 90 mass % is preferable, 15 mass % to 80 mass % is more preferable, and 25 mass % to 70 mass % is particularly preferable.

The self-dispersing resin, for example, may be structured using a structural unit derived from an aromatic group containing monomer and a cyclic aliphatic group containing monomer and a structural unit derived from a dissociative group containing monomer. In addition, other structural units may further be included as necessary.

The monomer which forms other structural units is not particularly limited as long as it can be copolymerized with the aromatic group containing monomer and the dissociative group containing monomer. Of these, from the viewpoint of flexibility of a polymer skeleton and easiness of glass transition temperature (Tg) control, an alkyl group containing monomer is preferable.

As the alkyl group containing monomer, for example, alkyl (meth)acrylate, such as methyl(meth)acrylate, ethyl(meth)

acrylate, isopropyl(meth)acrylate, n-propyl(meth)acrylate, n-butyl(meth)acrylate, isobutyl(meth)acrylate, t-butyl(meth)acrylate, hexyl(meth)acrylate, or ethylhexyl(meth)acrylate; an ethylenic unsaturated monomer having a hydroxyl group such as hydroxymethyl(meth)acrylate, 2-hydroxyethyl (meth)acrylate, 2-hydroxypropyl(meth)acrylate, 4-hydroxybutyl(meth)acrylate, hydroxypentyl(meth)acrylate, or hydroxyhexyl(meth)acrylate; dialkylaminoalkyl(meth)acrylate such as dialkylminoethyl(meth)acrylate; (meth)acrylamide such as N-hydroxyalkyl(meth)acrylamide such as N-hydroxymethyl(meth)acrylamide, N-hydroxyethyl(meth)acrylamide, N-hydroxybutyl(meth)acryamide; N-alkoxyalkyl(meth)acrylamide such as N-methoxymethyl(meth)acryamide, N-ethoxymethyl(meth)acrylamide, N-(n-iso)butoxymethyl(meth)acrylamide, N-methoxyethyl(meth)acrylamide, N-ethoxyethyl(meth)acrylamide, or N-(n-iso)butoxyethyl(meth)acrylamide or the like may be included.

As the molecular weight range of the non-water-soluble polymer which composes the self-dispersing resin particles, a weight-average molecular weight of 3,000 to 200,000 is preferable, 5,000 to 150,000 is more preferable, and 10,000 to 100,000 is even more preferable. A weight-average molecular weight of greater than or equal to 3,000 may effectively suppress the amount of water-soluble ingredient. Also, a weight-average molecular weight of less than or equal to 200,000 may increase the stability of self-dispersion.

Also, the weight-average molecular weight is measured by Gel Permeation Chromatography (GPC). As a GPC, HLC-8020 GPC (manufactured by Tosoh Co., Ltd.) is used, for columns, 3 TSKgel Super Multipore HZ-H columns (manufactured by Tosoh Co., Ltd., 4.6 mmID×15 cm) are used, and as an eluent, THF (tetrahydrofuran) is used. Also, an IR detector is used at a sample concentration of 0.45 mass %, and a flow rate of 0.35 ml/min, a sample injection amount of 10 μl, and a measurement temperature of 40° C. are conditions. Also, a calibration curve is made from 8 samples of "TSK standard, polystyrene" manufactured by Tosoh Co., Ltd.: "F-40", "F-20", "F-4", "F-1", "A-5000", "A-2500", "A-1000", "n-propylbenzene".

As the non-water-soluble polymer which composes the self-dispersing resin particles, from the viewpoint of a hydrophilic property control of the polymer, including a structural unit derived from an aromatic group containing (meth)acrylate monomer (preferably a structural unit derived from phenoxyethyl(meth)acrylate and/or a structural unit derived from benzyl(meth)acrylate) or a cyclic aliphatic group containing monomer (preferably alicyclic (meth)acrylate) as a copolymerization ratio of 15 to 80 mass % with regard to the total amount of the self-dispersing resin particles are preferable.

Also, as the non-water-soluble polymer, from the viewpoint of a hydrophilic property control of the polymer, it is preferable that an aromatic group containing (meth)acrylate monomer or a structural unit derived from alicyclic (meth)acrylate monomer as a copolymerization ratio of 15 to 80 mass % and a structural unit derived from a carboxyl group containing monomer and a structural unit derived from an alkyl group containing monomer (preferably a structural unit derived from alkylester of (meth)acrylic acid) be included, and it is more preferable that a structural unit derived from phenoxyethyl(meth)acrylate and/or a structural unit derived from benzyl(meth)acrylate as a polymerization ratio of 15 to 80 mass %, a structural unit derived from a carboxyl group containing monomer and a structural unit derived from an alkyl group containing monomer (preferably a structural unit derived from alkylester having a carbon number of 1 to 4 of (meth)acrylic acid) be included.

Also, as the non-water-soluble polymer, it is preferable that its acid value be 25 to 100 and its weight-average molecular weight be 3,000 to 200,000 and it is more preferable that its acid value be 25 to 95 and its weight-average molecular weight be 5,000 to 150,000.

Hereinafter, as specific examples of non-water-soluble polymer which composes the self-dispersing resin particles, Compounds B-01 to B-23 are included, however, the present invention is not limited to these examples. Also numbers in parenthesis represent mass ratios of the copolymer component.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl acrylate/benzyl acrylate/methacrylic acid copolymer (45/47/8)
B-09: styrene/phenoxyethyl acrylate/butyl methacrylate/acrylic acid copolymer (5/48/40/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)
B-20: methyl methacrylate/isobornyl methacrylate/methacrylic acid copolymer (20/72/8)
B-21: methyl methacrylate/isobornyl methacrylate/methacrylic acid copolymer (40/52/8)
B-22: methyl methacrylate/isobornyl methacrylate/dicyclopentanyl methacrylate/methacrylic acid copolymer (20/62/10/8)
B-23: methyl methacrylate/dicyclopentanyl methacrylate/methacrylic acid copolymer (20/72/8)

A method for producing the non-water-soluble polymer which composes the self-dispersing resin particles is not particularly limited and, for example, may be a method in which, in the presence of a polymerizable surfactant, the non-water-soluble polymer is joined to the surfactant by covalent bonding by emulsion polymerization, or a method in which a monomer mixture including a hydrophilic group containing monomer and an aromatic group containing monomer or alicyclic group containing monomer is copolymerized by well-known methods such as a solution polymerization method or a bulk polymerization method. Of the polymerization methods, from the viewpoint of aggregation rate and ejecting stability when it becomes the ink composition, a solution polymerization method is preferable and a solution polymerization method using an organic solvent is more preferable.

The self-dispersing resin particles, from the viewpoint of aggregation rate, include a polymer synthesized in organic solvent, the polymer has an anionic group (a carboxyl group), (preferably an acid value is 20 to 100), and is prepared as a polymer dispersed substance in water as a continuous phase in which a part or whole of the anionic groups (the carboxyl groups) are neutralized and prepared.

That is, in a preparation of the self-dispersing resin particles, it is preferable that a step be performed and carried out in which the polymer is synthesized in an organic solvent and a dispersing step in which an aqueous dispersed substance at least a part of an anionic group (a carboxyl group) of the polymer is neutralized and becomes an aqueous dispersed substance.

In the dispersing step, it is preferable that the following step (1) and step (2) be included.

Step (1): A step in which a mixture containing the polymer (the non-water-soluble polymer), an organic solvent, a neutralizing agent, and an aqueous medium is stirred.

Step (2): A step in which the organic solvent is removed from the mixture.

In Step (1), it is preferable that, first, the polymer (non-water-soluble polymer) be dissolved in the organic solvent, then, the neutralizing agent and the aqueous medium be slowly added, mixed and stirred, resulting in a dispersed substance. In this manner, by adding the neutralizing agent and the aqueous medium into the solution of the non-water-soluble polymer dissolved in the organic solvent, without the need of strong sheer force, a particle size of the self-dispersing resin particles with higher storage stability may be obtained.

The stirring method of the mixture is not particularly limited, and a generally used mixing stirring device or an ultrasonic dispersing machine or a high-pressure homogenizer may be used as needed.

Also, in Step (2), from the dispersed substance obtained from Step (1), the organic solvent is distilled off and phase inverted to an aqueous phase using a conventional method such as vacuum distillation resulting in the aqueous dispersed substance of the self-dispersing resin particle. The organic solvent in the aqueous dispersed substance obtained is substantially removed, and it is preferable that the amount of the organic solvent be less than or equal to 0.2 mass % and more preferable that less than or equal to 0.1 mass %.

As the organic solvent, an alcohol-based solvent, a ketone-based solvent, and an ether based-solvent is preferable. As the organic solvent, the organic solvent disclosed as an example in paragraph 0059 in JP2010-188661A may be used.

As the neutralizing agent, neutralizing agents disclosed as examples in paragraphs 0060 to 0061 in JP2010-188661A may be used.

As an average particle diameter of the resin particles according to the present invention (the self-dispersing resin particles, in particular), the range of 10 to 400 nm as a volume average particle diameter is preferable, the range of 10 to 200 nm is more preferable, the range of 10 to 100 nm is even more preferable, and the range of 10 to 50 nm is particularly preferable. A volume average particle diameter of greater than or equal to 10 nm improves the preparation suitability and a volume average particle diameter of less than or equal to 400 nm improves the storage stability. Also, regarding a particle size distribution of the resin particles, it is not particularly limited and particles with either a wide particle size distribution or with a mono-dispersing particle size distribution can be used. Also the resin particles may be used as a combination of two or more types.

Also, an average particle diameter and particle size distribution of the resin particles are determined from measuring a volume average particle size by dynamic light scattering method using nano track particle size distribution measuring device UPA-EX150 (manufactured by Nikkiso Co., Ltd.).

The ink composition according to the present invention may contain only one type of resin particle (preferably the self-dispersing resin particles) or may contain two or more types.

As a content of the resin particles (preferably the self-dispersing resin particles) in the ink composition (the total content), from the viewpoint of an image glossiness, 1 to 30 mass % is preferable and 3 to 15 mass % is more preferable with regard to the total amount of the ink composition.

(Water)

In the ink composition according to the present invention, it is preferable that water be contained. As the content of water, while not particularly limited, the range or 10 to 99 mass % is preferable, 30 to 80 mass % is more preferable, and 50 to 80 mass % is even more preferable.

(Organic Solvent)

In the ink composition according to the present invention, it is more preferable that at least one type of organic solvent (preferably a water-soluble organic solvent) be further contained. Containing the organic solvent, the water-soluble organic solvent in particular, may prevent dryness and enhance penetration.

If the water-soluble organic solvent is used as an anti-drying agent, a possible nozzle clogging caused by ink dryness at an ink discharge port when the image is recorded by discharging the ink composition using an ink jet method may be effectively prevented.

To prevent dryness, the water-soluble organic solvent with lower vapor pressure than water is preferable. As specific examples of the water-soluble organic solvent suitable for dryness prevention, polyalcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, or trimethanolpropane, lower alkyl ethers of polyalcohol such as ethylene glycol monomethyl (or ethyl)ether, diethylene glycol monomethyl (or ethyl)ether, triethylene glycol monoethyl (or butyl)ether, or tripropylene glycol monomethyl (or ethyl)ether, heterocyclics such as 2-pyrrolidone, N-methyl-2-pyrrolidone, 1,3-dimethyl-2-imidazolidinone, or N-ethylmorpholine, a sulfur containing compound such as sulfolane, dimethylsulfoxide, or 3-sulfolene, a polyfunctional compound such as diacetone alcohol or diethanolamine, a urea derivative or the like may be included.

Among these, polyalcohols such as glycerin or diethyl glycol are preferable. Also, these may be used alone or as a combination of two or more. It is preferable that the water-soluble organic solvent such as this be contained in the ink composition at 10 to 50 mass %.

Also, for penetration enhancement, from the viewpoint of a better penetration of the ink composition into the recording medium, the water-soluble organic solvent is preferably used. Specific examples of the water-soluble organic solvent suitable for penetration enhancement include alcohols such as ethanol, isopropanol, butanol, di(tri)ethylene glycol monobutyl ether, tripropylene glycol monomethyl(or ethyl)ether, or 1,2-hexanediol, sodium lauryl sulfate, sodium oleate or a nonionic surfactant. Favorable effects may be obtained by the ink composition containing 5 to 30 mass % of these. Also, it is preferable that an added amount of the water-soluble organic solvent be within the range in which a printing and image blur and a paper missing (a print through) do not occur.

Also, the water-soluble organic solvent may be used to adjust the viscosity other than in the use described above. Specific examples of water-soluble organic solvent which can be used to adjust the viscosity include alcohols (for example, methanol, ethanol, propanol, isopropanol, butanol, isobutanol, sec-butanol, t-butanol, pentanol, hexanol, cyclohexanol, or benzyl alcohol), a polyalcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), an amine (for example, ethanolamine, diethanolamine, triethanolamine, N-methyl diethanolamine, N-ethyldiethanolamine, morpholine, N-ethyl morpholine, ethylenediamine, diethylenetriamine, triethylenetetramine polyethyleneimine, or tetramethylpropylenediamine) and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, or acetone).

In addition, water-soluble organic solvents may be used either alone or as a combination of two or more.

(Surfactant)

The ink composition according to the present invention preferably contains at least one type of surfactant.

As the surfactant, a nonionic surfactant, a cationic surfactant, an anionic surfactant, or a betaine surfactant or the like may be included. From the viewpoint of aggregation rate, an anionic surfactant or a nonionic surfactant is preferable.

It is preferable that the content of the surfactant is an amount which adjusts the surface tension of the ink composition to be greater than or equal to 25 mN/m and less than or equal to 40 mN/m in order to favorably eject using the ink jet method. Within the range, the content of the surfactant is an amount more preferable which adjusts the surface tension to be greater than or equal to 27 mN/m and less than or equal to 37 mN/m.

In addition, these surfactants may be used as a defoaming agent. As the surfactant, a chelating agent represented by a fluorine-based compound, a silicon-based compound, and EDTA may also be used.

(Other Additives)

The ink composition according to the present invention may further contain other additives besides the above ingredients. As other additives, for example, well-known additives such as an anti-fading agent, an emulsion stabilizer, a penetration enhancer, an ultraviolet absorbing agent, a preservative, a fungicide, a pH adjusting agent, an anti-foaming agent, a viscosity adjusting agent, a dispersion stabilizer, an anti-rust agent, or a chelating agent may be included. These various additives may be directly added after the preparation of the ink composition or may be added at the time of the preparation of the ink composition.

As the pH adjusting agent, a neutralizing agent (organic base, inorganic alkali) may be used. From the viewpoint of improving storage stability of the ink composition, it is preferable that the pH adjusting agent be added so that the pH of the ink composition is 6 to 10 and it is more preferable that the pH adjusting agent be added so that the pH of the ink composition is 7 to 10.

As viscosity of the ink composition according to the present invention, from the viewpoint of discharge stability when discharged using the ink jet method and aggregation rate when using the process liquid described later, the range of 1 to 30 mPa·s is preferable, the range of 1 to 20 mPa·s is more preferable, the range of 2 to 15 mPa·s is even more preferable, and the range of 2 to 10 mPa·s is particularly preferable.

As the viscosity, the ink composition is measured at 25° C. suing VISCOMETER TV22 (manufactured by TOKI SANGYO CO., LTD.).

As the ink composition according to the present invention, it is preferable that the pigment coated with a polymer dispersing agent having a carboxyl group and the resin particles be included, the content of the solid be 7 to 10 mass %, and the content ratio of the solid other than the pigment to the pigment be 0.8 to 1.6. It is more preferable that the pigment coated with an acrylic-based polymer and the self-dispersing resin particles be included, the content of the solid be 7 to 9 mass %, and the content ratio of the solid other than the pigment to the pigment be 1.0 to 1.4.

Hereinbefore, the ink set of the present invention has been described, however, the ink set of the present invention is not particularly limited in the specific composition if the ink set contains a combination of at least one type of the ink composition and the process liquid.

A suitable composition of the ink set of the present invention may include a component made from a combination of a cyan ink which is the ink composition, a magenta ink which is the ink composition, a yellow ink which is the ink composition, and the process liquid (a three colored component) or a component made from a combination of a black ink which is the ink composition, a cyan ink which is the ink composition, a magenta ink which is the ink composition, a yellow ink which is the ink composition, and the process liquid (a four colored component).

However, the ink set of the present invention may be a one colored component or a two colored component made from one type or two types of the ink composition and the process liquid as necessary.

Also, the ink set of the present invention, in addition to the ink composition described above, may have another ink composition such as at least one or the like selected from a light cyan ink, a light magenta ink, and a light yellow ink as necessary. As the other ink composition described above, well-known ink composition may be used without particular limitation.

Also, the ink set of the present invention may contain two or more types of process liquid as necessary.

In a case that the ink set of the present invention may contain two or more types of ink composition, at least one type of the ink composition needs to be an ink composition containing the resin particles and the pigment. Also, in a case that the ink set of the present invention may contain two or more types of process liquid, at least one type of the process liquid needs to be a process liquid containing the organic acidic compound having a compound represented by General Formula (I).

The ink set of the present invention is suitably used by a following image forming method of the present invention.

<Image Forming Method>

In an image forming method, the ink set of the present invention described above is used and a process liquid applying step in which the process liquid is applied to the recording medium and an ink applying step in which the ink composition is applied to the recording medium are included. As a result of the image forming method in this configuration, the image in which roughness is suppressed may be formed.

The effect of roughness suppress is obtained from a combination of the compound represented by General Formula (I) in the process liquid and the resin particles in the ink composition, therefore, which of the process liquid applying step and ink applying step is carried out first does not matter.

However, from the viewpoint of an effective result of the present invention due to better aggregating property, carrying out the process liquid applying step first is preferred. That is, it is preferable that the image forming method of the present invention have the process liquid applying step in which the process liquid is applied to the recording medium and an ink applying step in which the ink composition is applied to the recording medium on which the process liquid is applied from the process liquid applying step.

(Process Liquid Applying Step)

The process liquid applying step is a step in which the process liquid is applied to the recording medium.

Application of the process liquid may be carried out using a well-known method such as a coating method, an ink jet method, a dipping method or the like. As the coating method, a well-known coating method such as a bar coater, an extrusion dye coater, an air doctor coater, a bread coater, a rod coater, a knife coater, a squeeze coater, a reverse roll coater, or may be carried out. Detailed description on the ink jet method is described later.

The process liquid applying step is prepared before the ink applying step in which the ink composition is used.

That is, on the recording medium, the process liquid for aggregation of the ingredient (such as the resin particles) in the ink composition is applied in advance before the ink composition is applied (ejected), and the ink composition is ejected so as to be in contact to the process liquid applied on the recording medium and visualized.

As a result, the ink jet recording may be speeded up and even with a high speed recording, an image with high concentration and high resolution may be obtained.

Also, in the present invention, it is preferable that, after the process liquid is applied on the recording medium, the process liquid on the recording medium be dried by heating in between until the ink composition is applied. As a result, a visible image with favorable color density and color can be recorded since an ink coloring property such as infiltration prevention becomes favorable.

The drying by heating may be carried out by a well-known heating method such as a heater or a blast method using a blast such as a dryer, or by a method in which these are combined.

As the heating method, for example, a method in which sending a heat using a heater or the like from the opposite side of the application side of the process liquid of the recording medium, a method in which applying a warm air or hot air to the applying side of the process liquid of the recording medium, a heating method using an infrared heater or the like may be used or a method combined of these may be used.

(Ink Applying Step)

In the ink applying step, the ink composition described above is applied (ejected) on the recording medium (preferably on the process liquid of the recording medium on which the process liquid is applied) using the ink jet method.

In this step, the ink composition may be applied on the recording medium and the visible image desired may be formed. Also, the detail of the ink composition is as described above.

The ink jet method is not particularly limited and any of well-known methods, for example, a charge control method in which an ink is discharged using electrostatic attraction force, a drop-on-demand method (a pressure pulse method) in which oscillatory pressure of a piezoelectric element is used, an acoustic ink jet method in which an electrical signal is converted to an acoustic beam, radiated to the ink, and then the ink is discharged using radiation pressure, and a thermal ink jet (Bubble Jet (registered trademark)) method in which the pressure generated from the bubble formation by the heating of the ink is used, may be used. In particular, the method disclosed in JP1979-59936A (JP-S54-59936A) in which the ink is discharged from the nozzle by a force generated due to a state change resulted from a sudden volume change of the ink influenced by heat energy may be effectively used.

Also, the ink jet method includes a method in which an ink with low concentration called photo ink is ejected numerously in small volumes, a method in which the image quality is improved using a plurality of ink practically in same color and but with different concentrations, or a method in which a colorless and transparent ink is used.

Also an ink jet head used in the ink jet method may be an on-demand method or a continuous method. Also, as a discharging method, an electrical—mechanical conversion (for example, a single cavity type, a double cavity type, a vendor type, a piston type, a shear mode type, a shared wall type or the like), an electrical—thermal conversion (for example, a thermal ink jet type, Bubble Jet (registered trademark) type or the like), an electrostatic attraction method (for example, an electric field control type, a slit jet type or the like) and a discharging method (for example, spark jet type or the like) and the like may be included as specific examples, however, any of these discharging methods can be used.

Also, the ink nozzle or the like used in recording in the ink jet method is not particularly limited and can be appropriately chosen depending on the purpose.

As the ink jet head, a shuttle method in which recording is carried out while the head is caused to scan toward the width direction of the recording medium using a single-scale serial head and a line method using a line head in which the recording element was arranged corresponding to one entire side of the recording medium. In the line method, carrying out the image recording on the whole surface of the recording medium is possible since the recording medium is scanned in perpendicular direction to the direction of the recording element arrangement, and a transporting system such as a carriage that scans the single-scale head becomes unnecessary. In addition, since control of the movement of the carriage and complex scanning with the recording medium becomes unnecessary, and only the recording medium gets moved, and speed-up of the recording rate compared with that in shuttle method may be realized.

The image forming method according to the present invention is applicable to any of these, however, when applied to the line method in which a dummy jet is not generally carried out, improvements of discharge accuracy and scratch resistance of the image is great.

The ink applying step preferably starts within 10 seconds after the process liquid applying step, and more preferably starts within greater than or equal to 0.1 seconds and less than or equal to 10 seconds. As a result, the image may be recorded at high speed.

Also, the image forming method according to the present invention, by using the ink set described above, even when the image is recorded at high speed, impact interference is suppressed and a highly accurate image may be formed.

Here, "starts within 10 seconds after the process liquid applying step" means that the time taken from applying, drying, ending of the process liquid to landing of the first ink drop on the recording medium is within 10 seconds.

Also in the ink applying step, from the viewpoint of a highly accurate printing, a liquid-drop amount of the ink drop applied (ejected) is preferably 1.5 to 3.0 pL, and more preferably 1.5 to 2.5 pL.

Also, the liquid-drop amount of the ink drop may be adjusted by an appropriate choice of the discharging condition in the nk jet method depending on the ink composition ejected.

(Heat Fixing Step)

In the present invention, it is preferable that a heat fixing step be further prepared in which the image (the ink) formed from the process liquid applying step and the ink applying step is fixed by heat.

As a result of the heat fixing step such as this, the image on the recording medium is fixed and the scratch resistance of the image is improved.

The heating is preferably carried out at a higher temperature than the minimum film-forming temperature (MFT) of the resin particles in the image. By heating at a temperature higher than MFT, the particles are coated and the image is strengthened.

When pressurizing along with the heating, as the pressure when pressurized, the range of 0.1 to 3.0 MPa is preferable, the range of 0.1 to 1.0 MPa is more preferable, and the range of 0.1 to 0.5 MPa is even more preferable from the viewpoint of a surface smoothing.

The method of heating is not particularly limited, however, a drying method in a non-contact manner may be included as a suitable example such as a method of heating using a heating element such as nichrome wire heater, a method of supplying warm air or hot air, or a method of heating with a halogen lamp or an infrared lamp.

Also, the method of heating and pressurizing is not particularly limited, however, a heat fixing method in a contact manner may be included as a suitable example such as a method of pressurizing the hotplate on the image forming surface of the recording medium, or a method in which a pair of rollers are passed through using a heating and pressurizing device equipped with a pair of heating and pressurizing rollers, a pair of heating and pressurizing belts, and a supporting roller displaced in the opposite site of them.

When heating and pressurizing, a nip time is preferably 1 millisecond to 10 seconds, more preferably 2 millisecond to 1 seconds, and even more preferably 4 millisecond to 100 milliseconds. Also, a nip width is Preferably 0.1 mm to 100 mm, more preferably 0.5 mm to 50 mm, and even more preferably 1 mm to 10 mm.

As a heating pressuring roller, a metal roller made of metal, or a roller in which a coating layer made of elastic body and, if necessary, a surface layer (or referred to as a release layer) prepared around a cored bar made of metal may be used. The cored bar in the latter, for example, is formed from a cylindrical body made of iron, aluminum, SUS, or the like and the surface of the cored bar, at least the part of it, is preferably covered with the coating later. Particularly, it is preferable that the coating layer be formed of a silicon resin or a fluorine resin having a releasing property. Also, it is preferable that the heating element be built-in inside of the cored bar at one side of the heating pressuring roller, and heating treatment and pressurizing treatment is carried out at the same time by passing through the recording medium between the rollers or, if necessary, heating may be carried out using two heating rollers by placing the recording medium in between. As the heating element, for example, a halogen lamp heater, a ceramic heater, a nichrome wire or the like is preferable.

As a belt substrate which composes a heating and pressurizing belt used in the heating and pressurizing device, a seamless nickel electric brass is preferable, and the thickness of the substrate is preferably 10 to 100 µm. Also, as a material for the belt substrate, aluminum, iron, polyethylene besides nickel may be used. In a case that the silicon resin or the fluorine resin is prepared, the thickness layer formed using these resins is preferably 1 to 50 µm, and more preferably 10 to 30 µm.

Also, in order to fulfill the pressure (a nip pressure), for example, an elastic member such as a spring having a tension is selected and installed at both sides of the roller such as the heating pressuring roller so as to obtain the nip pressure desired considering a nip gap.

The transporting speed of the recording medium when using the heating pressuring roller or the heating pressuring belt is preferably 200 to 700 mm/second, more preferably 300 to 650 mm/second, and more preferably 400 to 600 mm/second.

(Recording Medium)

In the image forming method of the present invention, the image is formed on the recording medium as described above.

As the recording medium, while not particularly limited, a general printing paper based on cellulose and used in general off-set printing or the like may be used. In the image recording by the general ink jet method using an aqueous ink, with the general printing paper based on cellulose, absorption and drying of the ink is slow, the movement of ink drops occurs easily after ejection, and image roughness occurs easily, relatively. However, according to the image forming method of the present invention, the movement of ink drops may be suppressed and the image roughness may be suppressed.

Also, as the recording medium, a so-called coated paper is suitable.

The coated paper is a paper in which the coat layer containing an inorganic pigment or the like is prepared on the surface of a high-class printing paper or an acid-free paper which is based on cellulose to be a support form and generally not surface treated. Uneven brightness of the image unit easily occurs on the coated paper, however, when phosphoric acid or a phosphoric acid compound is included in the process liquid, the occurrence of the uneven brightness of the image unit may effectively be suppressed. Specifically, an art paper, a coat paper, a light-weighted coat paper or coated fine paper is preferable.

The inorganic pigment contain in the coating layer is not particularly limited, however, from the viewpoint that an effect of suppression of uneven brightness is more remarkably shown by containing the phosphoric acid or the phosphoric acid compound in the process liquid, it is preferable that at least one type selected from silica, carillon, clay, baked clay, zinc oxide, tin oxide, magnesium sulfate, aluminum sulfate, aluminum hydroxide, pseudoboehmite, calcium carbonate, satin white, aluminum silicate, smectite, zeolite, magnesium silicate, magnesium carbonate, magnesium oxide and diatomite be used and it is more preferable that calcium carbonate, silica and carillon be used. In particular, in a case that calcium carbonate is included in the coating layer, the effect of suppression of uneven brightness by the phosphoric acid or the phosphoric acid compound is more remarkable.

As the recording medium, commercially available ones can be used and, for example, a high-class printing paper (A) such as "OK prince high-class" made by Oji Paper Co., Ltd., "shiorai" made by Nippon Paper Group, Inc. and "new NPI high-class" made by Nippon Paper Group, Inc., a coated fine paper such as "OK Ever Light Coat" made by Oji Paper Co., Ltd., and "Aurora S" made by Nippon Paper Group, Inc., a light-weighted coated paper (A3) such as "OK coat L" made by Oji Paper Co., Ltd., and "Aurora L" made by Nippon Paper Group, Inc., a coated paper (A2, B2) such as "OK Topkote+" made by Oji Paper Co., Ltd., and "Aurora coat" made by Nippon Paper Group, Inc., an art paper (A1) such as "OK Golden Cask+" made by Oji Paper Co., Ltd., and "Mitsubishi Special Art" made by Mitsubishi Paper Mills Co., Ltd. may be used. Also, a variety of photo paper for ink jet recording can be used.

Of the above, from the viewpoint of a great effect of suppression of a coloring material movement and obtaining a high-quality image with better color density and colors than in the past, an absorption coefficient of water, Ka, of the recording medium is preferably 0.05 to 0.5 mL/m$^2$·ms$^{1/2}$, more preferably 0.1 to 0.4 mL/m$^2$·ms$^{1/2}$, even more preferably 0.2 to 0.3 mL/m$^2$·ms$^{1/2}$.

The absorption coefficient of water, Ka, has the same meaning as that described in pulp test method No 51: 2000, JAPAN TAPPI (published by Japan Technical Association of the Pulp and Paper Industry) and specifically, the absorption coefficient, Ka, is calculated from the difference in the transition amount of water at contact time 100 ms and contact time 900 ms using automatic scanning absorptometer KM500Win (manufactured by Kumagai Riki Kogyo Co., Ltd.).

In the present invention, it is preferable that an application amount of the process liquid and application amount of the aqueous ink be adjusted as necessary. For example, depending on the recording medium, the application amount of the process liquid may be changed in order to adjust a physical property such as viscoelasticity of aggregates generated by mixing the process liquid with the aqueous ink.

EXAMPLES

Hereinafter, the present invention is described in more detail using examples. However, the scope of the present invention is not limited to the following examples. In addition, "parts" and "%" are by mass unless otherwise specified.

Also the weight-average molecular weight is measured using gel permeation chromatography (GPC). As a GPC, unless otherwise specified, an HLC-8020 GPC (manufactured by Tosoh Co., Ltd.) is used, for columns, 3 TSKgel Super Multipore HZ-H columns (manufactured by Tosoh Co., Ltd., 4.6 mmID×15 cm) are used, and as an eluent, THF (tetrahydrofuran) is used. Also, an IR detector is used at a sample concentration of 0.45 mass %, with a flow rate of 0.35 ml/min, a sample injection amount of 10 µl, and a measuring temperature of 40° C. as conditions. Also, a calibration curve is made from 8 samples of "TSK standard, polystyrene" produced by Tosoh Co., Ltd.: "F-40", "F-20", "F-4", "F-1", "A-5000", "A-2500", "A-1000", "n-propylbenzene".

Example 1

<Synthesis of Polymer Dispersing Agent P-1>

Polymer dispersing agent P-1 was synthesized according to the following scheme as shown below.

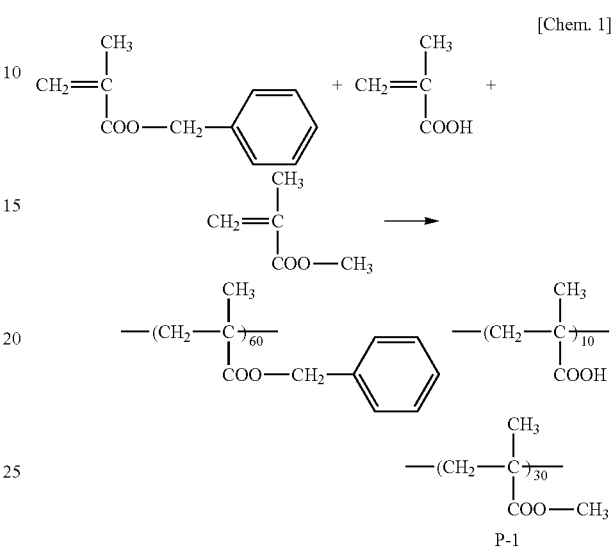

Methyl ethyl ketone (88 g) was introduced into a 1000 ml three-neck flask equipped with a stirrer and a condenser, then was heated at 72° C. under a nitrogen atmosphere, and a solution of dimethyl 2,2'-azobisisobutyrate (0.85 g), benzyl methacrylate (60 g), methacrylic acid (10 g), and methyl methacrylate (30 g) dissolved in methyl ethyl ketone (50 g) was added dropwise thereto for 3 hours. After the dropwise addition was completed and the mixture was further reacted for 1 hour, a solution of dimethyl 2,2'-azobisisobutyrate (0.42 g) dissolved in methyl ethyl ketone (2 g) was added, the temperature of the mixture was elevated to 78° C. and was heated for 4 hours. The reaction solution obtained was re-precipitated twice in a large excess of hexane, an extracted resin was dried, and polymer dispersing agent P-1 (96 g) was obtained. In addition, the number in each structural unit of the polymer dispersing agent P-1 shown above represents a mass ratio.

The composition of the resin obtained was identified with $^1$H-NMR and the weight average molecular weight (Mw) determined from GPC was 44,600. In addition, the acid value determined from a method described in JIS standard (JISK0070: 1992) was 65.2 mgKOH/g.

<Preparation of Pigment Dispersed Liquid>

(Preparation of Cyan Dispersed Liquid)

Pigment blue, a cyan pigment, 15:3 (phthalocyanine blue A220, made by Dainichiseika Color & Chemicals Mfg. Co., Ltd.) (10 parts), the polymer dispersing agent P-1 (5 parts), methyl ethyl ketone (42 parts), 1 standard NaOH aqueous solution (5.5 parts), ion-exchanged water (87.2 parts) were mixed and dispersed for 2 to 6 hours with beads mill using 0.1 mmϕ zirconia beads.

Methyl ethyl ketone was removed from the dispersed substance obtained under reduced pressure at 55° C. and after some of the water was also removed, and further, a supernatant besides the precipitates was collected by performing centrifugation for 30 minutes at 8,000 rpm using a 50 ml centrifuge tube, using a high-speed centrifugal chiller 7550 (manufactured by Kubota Corporation). Then, a pigment concentration was determined from an absorbance spectrum and a dispersed substance of resin-coated pigment particles (a pigment coated with the polymer dispersing agent) with the pigment concentration of 10.2 mass % (a cyan dispersed liquid C) was obtained. An average particle diameter of the cyan dispersed liquid C obtained was 105 nm.

(Preparation of Magenta Dispersed Liquid)

A dispersed substance of the resin-coated pigment particles (a pigment coated with the polymer dispersing agent) (a magenta dispersed liquid M) was prepared in the same manner as the preparation of the cyan dispersed liquid except that pigment red 122, a magenta pigment, was used instead of the pigment blue 15:3 (phthalocyanine blue A220, made by Dainichiseika Color & Chemicals Mfg. Co., Ltd.) used in the preparation of the cyan dispersed liquid. An average particle diameter of the magenta dispersed liquid M obtained was 85 nm.

(Preparation of Yellow Dispersed Liquid)

A dispersed substance of the resin-coated pigment particles (a pigment coated with the polymer dispersing agent) (a yellow dispersed liquid Y) was prepared in the same manner as the preparation of the cyan dispersed liquid except that pigment yellow 74, a yellow pigment, was used instead of the pigment blue 15:3 (phthalocyanine blue A220, made by Dainichiseika Color & Chemicals Mfg. Co., Ltd.) used in the preparation of the cyan dispersed liquid. An average particle diameter of the yellow dispersed liquid Y obtained was 82 nm.

(Preparation of Black Dispersed Liquid)

A dispersed substance of the resin-coated pigment particles (a pigment coated with the polymer dispersing agent) (a black dispersed liquid K) was prepared in the same manner as the preparation of the cyan dispersed liquid except that carbon black (NIPEX1604Q, made by Evonik Degussa Corporation), a black pigment, was used instead of the pigment blue 15:3 (phthalocyanine blue A220, made by Dainichiseika Color & Chemicals Mfg. Co., Ltd.) used in the preparation of the cyan dispersed liquid. An average particle diameter of the black dispersed liquid K obtained was 130 nm.

<Preparation of Self-dispersing Resin Particle>

Methyl ethyl ketone (360.0 g) was introduced into a 2 liter three-neck flask equipped with a stirrer, a thermometer, a reflux condenser, and a nitrogen gas inlet tube, and the temperature of the solution was elevated to 75° C. While maintaining the temperature within the reaction vessel at 75° C., a mixed solution consisting of phenoxyethyl acrylate (180.0 g), methyl methacrylate (162.0 g), acrylic acid (18.0 g), methyl ethyl ketone (72 g), and "V-601" (made by Wako Pure Chemical Industries, Ltd.) (1.44 g) was added dropwise at a constant rate so that the dropwise addition was completed in 2 hours. After the dropwise addition was completed, a solution consisting of "V-601" (0.72 g) and methyl ethyl ketone (36.0 g) was added, the mixture was stirred for 2 hours at 75° C., and then a solution consisting of "V-601" (0.72 g) and isopropanol (36.0 g) was further added, the mixture was stirred for 2 hours at 75° C., the temperature of the mixture was elevated to 85° C. and further stirring was continued for 4 hours. A Weight average molecular weight (Mw) of the copolymer obtained was 64,000 (calculated from polystyrene conversion by Gel Permeation Chromatography (GPC), the columns used were TSKgel Super HZM-H, TSKgel SuperHZ4000, and TSKgel SuperHZ200 (manufactured by Tosoh Corporation)), and an acid value thereof was 38.9 (mgKOH/g).

Next, the polymer solution (668.3 g) was weighed, isopropanol (388.3 g) and 1 mol/L NaOH aqueous solution (145.7 ml) was added thereto, and the temperature within the reaction vessel was elevated to 80° C. Then, distilled water (720.1 g) was added dropwise at a rate of 20 ml/min and the mixture was water dispersed. After that, the temperature within the reaction vessel was maintained at 80° C. for 2 hours, 85° C. for 2 hours, and 90° C. for 2 hours under atmospheric pressure, then, the pressure within the reaction vessel was reduced, isopropanol, methyl ethyl ketone, and distilled water (913.7 g, total sum) was removed, resulting in an aqueous dispersed substance (emulsion) of self-dispersing resin fine particles (B-01) in the solid concentration of 28.0%. In addition, the number in each structural unit of the example of the compound shown below (B-01) represents a mass ratio. Hereinafter, it is the same with regard to each structural formula.

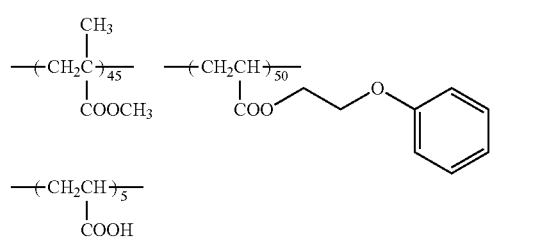

(B-01)

<Preparation of Ink>

Using each pigment dispersed liquid (cyan dispersed liquid C, magenta dispersed liquid M, yellow dispersed liquid Y, black dispersed liquid K) and self-dispersing resin particles B-01 obtained above, and by mixing each ingredient so as to become an ink composition shown in Table 1, each ink composition (magenta ink composition M1, M2, black ink composition, K1, K2, cyan ink composition, C1, C2, yellow ink composition, Y1, Y2) was prepared, respectively.

Each ink composition prepared was filtered using a PVDF 5 um filter (Millex SV manufactured by Millipore Corporation, 25 mm in diameter) using a plastic disposable syringe to obtain each completed ink (magenta ink M1, M2, black ink K1, K2, cyan ink C1, C2, yellow ink Y1, Y2).

For each completed ink, a pH was measured using a pH meter WM-50 EG manufactured by DKK-Toa Corporation. Also, surface tension was measured using a FASE Automatic Surface Tensiometer CBVP-Z manufactured by Kyowa Interface Science Co., Ltd.

The results are shown in Table 1.

TABLE 1

| Ink Composition | M1 | K1 | C1 | Y1 | M2 | K2 | C2 | Y2 |
|---|---|---|---|---|---|---|---|---|
| Magenta Pigment (Pigment Red 122) | 4% | — | — | — | 4% | — | — | — |
| Black Pigment (Carbon Black) | — | 4% | — | — | — | 4% | — | — |
| Cyan Pigment (Pigment Blue 15:3) | — | — | 4% | — | — | — | 4% | — |
| Yellow Pigment (Pigment Yellow 74) | — | — | — | 4% | — | — | — | 4% |
| Pigment dispersing agent (Polymer dispersing agent P-1) | 2% | 2% | 2% | 2% | 2% | 2% | 2% | 2% |

TABLE 1-continued

| Ink Composition | M1 | K1 | C1 | Y1 | M2 | K2 | C2 | Y2 |
|---|---|---|---|---|---|---|---|---|
| Nieuport GP-250 | 10% | 10% | 10% | 10% | 10% | 10% | 10% | 10% |
| Tripropylene glycol monomethyl ether | 5% | 5% | 5% | 5% | 5% | 5% | 5% | 5% |
| Olfine E1010 | 1% | 1% | 1% | 1% | 1% | 1% | 1% | 1% |
| Self-dispersing Polymer Particles (B-01) | 8% | 8% | 8% | 8% | — | — | — | — |
| Water | 70% | 70% | 70% | 70% | 78% | 78% | 78% | 78% |
| Physical property of completed ink: pH | 8.5 | 8.6 | 8.5 | 8.5 | 8.2 | 8.2 | 8.3 | 8.3 |
| Physical property of completed ink: Surface Tension (mM/m) | 34.8 | 35.2 | 35 | 35.1 | 34.6 | 35.2 | 35.2 | 34.8 |

<Description of Table 1>

Nieuport GP-250 . . . Organic solvent manufactured by Sanyo Chemical Industries, Ltd.

Olfine E1010 . . . Nonionic surfactant manufactured by Nissin Chemical Industry Co., Ltd.

<Preparation of Process Liquid 1 to 16>

Process liquids 1 to 16 were prepared by mixing each ingredient in the following Table 2.

For each process liquid, a pH was measured using a pH meter WM-50 EG manufactured by DKK-To a Corporation. Also, surface tension was measured using FASE Automatic Surface Tensiometer CBVP-Z manufactured by Kyowa Interface Science Co., Ltd.

The results are shown in Table 2.

The structure of water-soluble polymer A in Table 2 is shown below. In addition, the number in each structural unit of the water-soluble polymer A shown below represents a mass ratio (mass %).

Water-soluble Polymer A

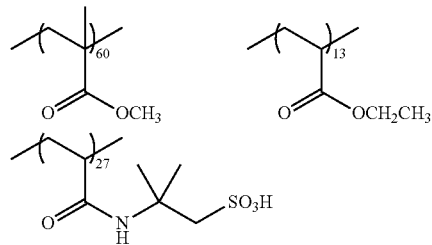

The water-soluble polymer A was synthesized as follows.

Isopropyl alcohol (30.0 g) was introduced into a 200 ml three-neck flask equipped with a stirrer, a thermometer, a reflux condenser, and a nitrogen gas inlet tube, and the temperature of the solution was elevated to 65° C. under a nitrogen atmosphere.

Next, to a mixed solution consisting of methyl methacrylate (30.0 g), ethyl acrylate (6.5 g), acrylamide-2-methylpropane sulfonic acid (13.5 g), isopropyl alcohol (30 g), and water (15 g), "V-601" (a polymerization initiator made by Wako Pure Chemical Industries, Ltd.) (2.97 g (0.0129 mol); 3 mol % with regard to the total number of moles of the monomer (0.430 mol)) was added dropwise at a constant rate so that the dropwise addition was completed in 2 hours.

After the dropwise addition was completed, the mixture was stirred for 2 hours, and then "V-601" (1.5 mol % with regard to the total number of moles of the monomer (1.48 g)) and isopropyl alcohol (3.0 g) was added and stirred for 2 hours.

The polymer solution obtained was neutralized with an aqueous solution of sodium hydroxide of an equal number of moles to acrylamide-2-methylpropane sulfonic acid used, isopropyl alcohol was distilled of by concentration under reduced pressure, and by adding water until the total amount of polymer solution reached 310 g, polymer aqueous solution containing 16 mass % of water-soluble polymer A was obtained.

A weight average molecular weight (Mw) of the water-soluble polymer A obtained was 45,000 (calculated from polystyrene conversion by Gel Permeation Chromatography (GPC), the columns used were TSKgel Super HZM-H, TSKgel SuperHZ4000, and TSKgel SuperHZ200 (manufactured by Tosoh Corporation)).

TABLE 2

| Process | 1 | 2 | 3 | 4 | 5 | 6 | 7 | 8 | 9 |
|---|---|---|---|---|---|---|---|---|---|
| Diethylene glycol monoethyl ether | 4% | 4% | 4% | 4% | 4% | 4% | 4% | 4% | 4% |
| Tripropylene glycol monomethyl ether | 4% | 4% | 4% | 4% | 4% | 4% | 4% | 4% | 4% |
| 1,2,3-Propanetricarboxylic acid | 21.5% | 10.75% | — | 17.2% | 15.45% | 1.55% | 2.85% | 5.2% | 8.6% |
| 1,3,5-Pentanetricarboxylic acid | — | — | — | — | — | — | — | — | — |
| 1,2,3,4-Butanetetracarboxylic acid | — | — | — | — | — | — | — | — | — |
| Malonic acid | — | — | 17.2% | — | 3.85% | 9.15% | 16.45% | 12% | 8.6% |
| Malic acid | — | — | — | — | — | — | — | — | — |
| Glutaric Acid | — | — | — | — | — | — | — | — | — |
| Maleic Acid | — | — | — | — | — | — | — | — | — |
| Dimethylmalonic acid | — | — | — | — | — | — | — | — | — |
| Phosphoric acid | — | 10.75% | 4.3% | 4.3% | 2.2% | 10.8% | 2.2% | 4.3% | 4.3% |
| Polyphosphoric acid | — | — | — | — | — | — | — | — | — |
| Water-soluble Polymer A (16% aqueous solution) | 2.5% | 2.5% | 2.5% | 2.5% | 2.5% | 2.5% | 2.5% | 2.5% | 2.5% |
| Benzotriazole | 1% | 1% | 1% | 1% | 1% | 1% | 1% | 1% | 1% |
| Ion-exchanged Water | 67% | 67% | 67% | 67% | 67% | 67% | 67% | 67% | 67% |
| pH | 1.4 | 0.6 | 0.8 | 1.0 | 1.4 | 0.4 | 1.6 | 0.9 | 1.1 |
| Surface Tension (mN/m) | 42 | 42 | 41 | 41 | 41 | 42 | 43 | 41 | 41 |

TABLE 2-continued

| Process | 10 | 11 | 12 | 13 | 14 | 15 | 16 |
|---|---|---|---|---|---|---|---|
| Diethylene glycol monoethyl ether | 4% | 4% | 4% | 4% | 4% | 4% | 4% |
| Tripropylene glycol monomethyl ether | 4% | 4% | 4% | 4% | 4% | 4% | 4% |
| 1,2,3-Propanetricarboxylic acid | — | — | 2.6% | 2.6% | 2.6% | 2.6% | 2.6% |
| 1,3,5-Pentanetricarboxylic acid | 2.6% | — | — | — | — | — | — |
| 1,2,3,4-Butanetetracarboxylic acid | — | 2.6% | — | — | — | — | — |
| Malonic acid | 14.6% | 14.6% | — | — | 7.3% | — | — |
| Malic acid | — | — | 14.6% | — | 7.3% | 7.3% | — |
| Glutaric Acid | — | — | — | 14.6% | — | 7.3% | — |
| Maleic Acid | — | — | — | — | — | — | 7.3% |
| Dimethylmalonic acid | — | — | — | — | — | — | 7.3% |
| Phosphoric acid | 4.3% | 4.3% | 4.3% | 4.3% | 4.3% | 4.3% | — |
| Polyphosphoric acid | — | — | — | — | — | — | 4.3% |
| Water-soluble Polymer A (16% aqueous solution) | 2.5% | 2.5% | 2.5% | 2.5% | 2.5% | 2.5% | 2.5% |
| Benzotriazole | 1% | 1% | 1% | 1% | 1% | 1% | 1% |
| Ion-exchanged Water | 67% | 67% | 67% | 67% | 67% | 67% | 67% |
| pH | 1.2 | 1.2 | 1.1 | 0.8 | 0.9 | 0.8 | 0.8 |
| Surface Tension (mN/m) | 42 | 44 | 42 | 42 | 41 | 42 | 42 |

<Ink Set>

Ink sets 1 to 17 were prepared in which each completed ink (magenta ink M1, M2, black ink K1, K2, cyan ink C1, C2, yellow ink Y1, Y2) and each process liquid (process liquids 1 to 16) was combined as shown in Table 3.

In the following Table 3, a combination of magenta ink M1, black ink K1, cyan ink C1, and yellow ink Y1 was called ink No. 1 (Ink 1), and a combination of magenta ink M2, black ink K2, cyan ink C2, and yellow ink Y2 was called ink No. 2 (Ink 2).

<Image Formation>

A4 size Mitsubishi Special Art made by Mitsubishi Paper Mills Co., Ltd. was used as the recording medium and ink sets 1 to 17 shown in the following Table 3 were used and thus the image was formed under following conditions.

Also, in the following image formation, ink ejection was made to initiate within 10 seconds after the process liquid applying step.

(Process Liquid Applying Step)

The process liquid was coated on the surface of the recording medium so that the coating amount was 1.7 g/m² using a coating bar immediately before applying the ink on the recording medium.

Subsequently, the process liquid applied on the recording medium was dried under following conditions.

—Drying Condition for the Process Liquid (Blast Drying)—

Air speed: 15 m/s

Temperature and the heating method: Heating was performed using a contact-type plane heater from the back side of the recording medium (the side where the process liquid is not applied) so that the surface temperature of the recording medium (the temperature of the side where the process liquid is applied) was 60° C.

Blast area: 450 mm (drying time 0.7 seconds)

(Ink Applying Step)

On the recording medium in which the process liquid was applied, 4-colored single pass image formation was performed under following conditions.

Specifically, on the process liquid of the recording medium in which the process liquid was applied, the ink with each color was applied (ejected) under following conditions to form an image.

Head: a head in which a piezo full-line head with a width of 1,200 dpi/20 inch was arranged as 4 color-coded was used.

The amount of discharged droplet: 2.4 pL

Drive frequency: 30 kHz (transporting speed of the recording medium 635 mm/sec)

Next, the ink applied on the recording medium was dried under following conditions.

—Drying Condition for the Ink (Blast Drying)—

Air speed: 15 m/s

Temperature: Heating was performed using a contact-type plane heater from the opposite side of the recording medium (the side where the ink is not applied) so that the surface temperature of the recording medium (the temperature of the side where the ink is applied) was 60° C.

Blast area: 640 mm (drying time 1 second)

(Heat Fixing Step)

The image formed by applying the ink was fixed by heat using a silicon rubber roller (hardness 50°, nip width 5 mm) under following conditions.

As a result, a sample in which the image is formed on the recording medium was obtained.

—Conditions for Heat Fixing—

Temperature of the roller: 90° C.

Pressure: 0.8 MPa

<Evaluation>

1. Evaluation of Image Roughness

In the ink applying process, a solid image of magenta was formed by applying the magenta ink on the process liquid in a solid form, and the cyan ink was applied on the solid image of the magenta obtained in a halftone form so that the halftone area ratio was 50% to 80%, resulting in a secondary color image.

To the secondary color image obtained, the heat fixing treatment described above was performed.

The secondary color image after the heat fixing was observed visually and the image roughness was evaluated according to the following grades.

—Evaluation Grades—

5. No roughness was observed and the image was uniform in overall.
4. Very small roughness was observed, however, the image was nearly uniform in overall.
3. Small roughness was observed, however, it was a level that there was no problem in practical use.
2. Roughness was frequently occurred and was visually noticeable and it was a level that there might be problems in practical use.

1. Roughness with strong shades was frequently occurred and it was a level that the image might not be considered uniform.

2. Evaluation of Scratch Resistance of the Image the secondary color image formed in the roughness evaluation was rubbed 5 times on the recording medium which was not painted (the Mitsubishi special art) with a weight of 240 g/cm$^2$ immediately after the painting—within 10 minutes. Then, the part where the secondary color image rubbed was observed visually and scratch resistance of the image was evaluated according to the following grades.

—Evaluation Grades—

5. It was a level that the rubbed part was not at all damaged and same as the un-rubbed part.
4. The surface of the rubbed part was slightly damaged, however, it was a level where there was no damage to the image and no problem in practical use.
3. The surface of the rubbed part was slightly peeled off, very fine scratches were noticeable, therefore, it was a level of a lower limit of practical use.
2. The surface of the rubbed part was peeled off, scratches were observed, therefore, it was a level that there might be problems in practical use.
1. The ink of the rubbed part was peeled off, white background of the medium was partially exposed, therefore, it was a level of no practical use.

3. Evaluation of Uneven Brightness of the Image

The secondary color image was formed on the recording medium in the same manner as that of the roughness evaluation (hereinafter, the surface of the side in which the image is formed is referred to "front surface" for convenience sake). Next, on the part of the other side of the recording medium (the side where the secondary color image is not formed), secondary color image was formed under the same condition as that under which the secondary color image formed on the front surface. As a result, on one recording medium, a one-sided image unit in which the secondary color image was formed on one side and a both-sided image unit in which the secondary color image was formed on both sides were prepared.

Next, brightness of the secondary color image in the one-sided image unit (hereinafter, referred to as "brightness a") and brightness of the secondary color image in the both-sided image unit (hereinafter, referred to as "brightness b") were measured, respectively. Here, measurement of the brightness was carried out at an incidence angle of 60° using a HORIBA GLOSS CHECKER IG-331 (manufactured by Horiba, Ltd.).

Based on the difference between brightness a and brightness b, uneven brightness was evaluated according to the following grades.

Also, the uneven brightness here is a stain caused from a calcium salt produced by a reaction of calcium carbonate contained in the coat layer of the recording medium and the organic acidic compound contained in the process liquid. Therefore, the bigger the difference between brightness a and brightness b, the more conspicuous the uneven brightness becomes.

—Evaluation Grades—

A. The difference between brightness a and brightness b was less than 1%.
B. The difference between brightness a and brightness b was greater than or equal to 1% and less than 5%.
C. The difference between brightness a and brightness b was greater than or equal to 5% and less than 10% and was within the acceptable limit.
D. The difference between brightness a and brightness b was greater than or equal to 10% and was a level of no practical use.

TABLE 3

| Ink Set No. | Ink Resin Particle No. | Process Liquid No. | Organic Acid A | Organic Acid B | Inorganic Acid | Ratio of organic acid A | Ratio of whole organic acid | Roughness | Scratch resistance | Uneven brightness | Remarks |
|---|---|---|---|---|---|---|---|---|---|---|---|
| 1 | 2 No | 1 | 1,2,3-Propanetricarboxylic acid | — | — | 100% | 100% | 1 | 1 | C | Comparative Example |
| 2 | 2 No | 2 | 1,2,3-Propanetricarboxylic acid | — | Phosphoric acid | 100% | 50% | 1 | 3 | B | Comparative Example |
| 3 | 1 Yes | 3 | — | Malonic acid | Phosphoric acid | — | 80% | 2 | 4 | D | Comparative Example |
| 4 | 1 Yes | 1 | 1,2,3-Propanetricarboxylic acid | — | — | 100% | 100% | 4 | 3 | C | Present Invention |
| 5 | 1 Yes | 4 | 1,2,3-Propanetricarboxylic acid | — | Phosphoric acid | 100% | 80% | 4 | 3 | B | Present Invention |
| 6 | 1 Yes | 5 | 1,2,3-Propanetricarboxylic acid | Malonic acid | Phosphoric acid | 15% | 80% | 4 | 4 | B | Present Invention |
| 7 | 1 Yes | 6 | 1,2,3-Propanetricarboxylic acid | Malonic acid | Phosphoric acid | 15% | 50% | 3 | 4 | A | Present Invention |
| 8 | 1 Yes | 7 | 1,2,3-Propanetricarboxylic acid | Malonic acid | Phosphoric acid | 15% | 90% | 4 | 4 | B | Present Invention |
| 9 | 1 Yes | 8 | 1,2,3-Propanetricarboxylic acid | Malonic acid | Phosphoric acid | 30% | 80% | 5 | 4 | B | Present Invention |
| 10 | 1 Yes | 9 | 1,2,3-Propanetricarboxylic acid | Malonic acid | Phosphoric acid | 50% | 80% | 5 | 3 | B | Present Invention |
| 11 | 1 Yes | 10 | 1,3,5-Pentanetricarboxylic acid | Malonic acid | Phosphoric acid | 15% | 80% | 5 | 4 | B | Present Invention |
| 12 | 1 Yes | 11 | 1,2,3,4-Butanetetracarboxylic acid | Malonic acid | Phosphoric acid | 15% | 80% | 5 | 4 | B | Present Invention |
| 13 | 1 Yes | 12 | 1,2,3-Propanetricarboxylic acid | Malic acid | Phosphoric acid | 15% | 80% | 4 | 5 | B | Present Invention |
| 14 | 1 Yes | 13 | 1,2,3-Propanetricarboxylic acid | Glutaric acid | Phosphoric acid | 15% | 80% | 4 | 4 | B | Present Invention |

TABLE 3-continued

| | Ink | | | Process Liquid | | | Ratio of organic acid A | Ratio of whole organic acid | Evaluation | | | |
|---|---|---|---|---|---|---|---|---|---|---|---|---|
| Ink Set No. | Resin Particle | No. | Organic Acid A | Organic Acid B | Inorganic Acid | | | | Rough-ness | Scratch resis-tance | Uneven bright-ness | Remarks |
| 15 | 1 Yes | 14 | 1,2,3-Propanetricarboxylic acid | Malonic acid + Malic acid | Phosphoric acid | 15% | 80% | 5 | 5 | B | Present Invention |
| 16 | 1 Yes | 15 | 1,2,3-Propanetricarboxylic acid | Glutaric acid + Malic acid | Phosphoric acid | 15% | 80% | 5 | 5 | B | Present Invention |
| 17 | 1 Yes | 16 | 1,2,3-Propanetricarboxylic acid | Dimethyl-malonic acid + Maleic acid | Poly-phosphoric acid | 15% | 80% | 5 | 5 | B | Present Invention |

<Description of Table 3>

"Organic acid A" represents the compound represented by General Formula (I).

"Organic acid B" represents the compound containing two carboxyl groups within one molecule.

"Ratio of organic acid A" represents the content (mass %) of the compound represented by General Formula (I) in all organic acidic compounds (here, the total amount of organic acid A and organic acid B).

"Ratio of all organic acids" represents the content (mass %) of all organic acidic compounds with regard to the total sum of all organic acidic compounds (here, the total amount of organic acid A and organic acid B), and phosphoric acid and the phosphoric acid compound.

As polyphosphoric acid, polyphosphoric acid of CAS number 8017-16-1 was used.

As shown in Table 3, in ink sets 4 to 17 in which the resin particles were contained in the ink and the compound represented by General Formula (I) was contained in the process liquid, the image roughness was suppressed.

On the other hand, in ink sets 1 and 2 in which the resin particles were not contained in the ink, and in ink set 3 in which the compound represented by General Formula (I) was not contained in the ink, the image roughness was increased.

Also, among ink sets 4 to 17, in ink sets 5 to 17 in which phosphoric acid was contained in the process liquid, the uneven brightness of the image was suppressed.

Also, among ink sets 4 to 17, in ink sets 6 to 9 and 11 to 17 in which the content of the compound represented by General Formula (I) in all organic acidic compounds was 5 mass % to 30 mass %, the scratch resistance of the image was exceptionally excellent.

Also, among ink sets 4 to 17, in ink sets to 6 and 8 to 17 in which the content of all organic acidic compounds with regard to the total sum of all organic acidic compounds, and phosphoric acid and the phosphoric acid compound was 60 mass % to 90 mass %, a balance between suppression of the image roughness, suppression of the uneven brightness of the image and improvement of the scratch resistance of the image was exceptionally excellent.

Hereinbefore, the evaluation result of the secondary color image by the magenta ink and the cyan ink was described. However, when the same evaluation was performed on the halftone image with a halftone area ratio of 50% to 80% formed using the black ink (a black single-color image), the same evaluation results as those of the secondary color image were obtained.

Example 2

Process liquids 1 to 16 in Example 1 shown in the Table 2 were changed to process liquids 17 to 32 shown in the Table 4 below, respectively, and the image was formed and evaluated in the same manner as that of Example 1.

As a result, evaluation results the same as those of Example 1 were obtained.

TABLE 4

| Process liquid | 17 | 18 | 19 | 20 | 21 | 22 | 23 | 24 | 25 |
|---|---|---|---|---|---|---|---|---|---|
| Diethylene glycol monoethyl ether | 4% | 4% | 4% | 4% | 4% | 4% | 4% | 4% | 4% |
| Tripropylene glycol monomethyl ether | 4% | 4% | 4% | 4% | 4% | 4% | 4% | 4% | 4% |
| 1,2,3-Propanetricarboxylic acid | 21.5% | 10.75% | — | 17.2% | 15.45% | 1.55% | 2.85% | 5.2% | 8.6% |
| 1,3,5-Pentanetricarboxylic acid | — | — | — | — | — | — | — | — | — |
| 1,2,3,4-Butanetetracarboxylic acid | — | — | — | — | — | — | — | — | — |
| Malonic acid | — | — | 17.2% | — | 3.85% | 9.15% | 16.45% | 12% | 8.6% |
| Malic acid | — | — | — | — | — | — | — | — | — |
| Glutaric Acid | — | — | — | — | — | — | — | — | — |
| Maleic Acid | — | — | — | — | — | — | — | — | — |
| Dimethylmalonic acid | — | — | — | — | — | — | — | — | — |
| Phosphoric acid | — | 10.75% | 4.3% | 4.3% | 2.2% | 10.8% | 2.2% | 4.3% | 4.3% |
| Polyphosphoric acid | — | — | — | — | — | — | — | — | — |
| Water-soluble Polymer A (16% aqueous solution) | 2.5% | 2.5% | 2.5% | 2.5% | 2.5% | 2.5% | 2.5% | 2.5% | 2.5% |
| Benzotriazole | 1% | 1% | 1% | 1% | 1% | 1% | 1% | 1% | 1% |
| Silicon Emulsion TSA-739 | 0.005% | 0.005% | 0.005% | 0.005% | 0.005% | 0.005% | 0.005% | 0.005% | 0.005% |

TABLE 4-continued

| | | | | | | | | | |
|---|---|---|---|---|---|---|---|---|---|
| Ion-exchanged Water | 67% | 67% | 67% | 67% | 67% | 67% | 67% | 67% | 67% |
| pH | 1.4 | 0.6 | 0.8 | 1.0 | 1.4 | 0.4 | 1.6 | 0.9 | 1.1 |
| Surface Tension (mN/m) | 42 | 42 | 41 | 41 | 41 | 42 | 43 | 41 | 41 |

| Process liquid | 26 | 27 | 28 | 29 | 30 | 31 | 32 |
|---|---|---|---|---|---|---|---|
| Diethylene glycol monoethyl ether | 4% | 4% | 4% | 4% | 4% | 4% | 4% |
| Tripropylene glycol monomethyl ether | 4% | 4% | 4% | 4% | 4% | 4% | 4% |
| 1,2,3-Propanetricarboxylic acid | — | — | 2.6% | 2.6% | 2.6% | 2.6% | 2.6% |
| 1,3,5-Pentanetricarboxylic acid | 2.6% | — | — | — | — | — | — |
| 1,2,3,4-Butanetetracarboxylic acid | — | 2.6% | — | — | — | — | — |
| Malonic acid | 14.6% | 14.6% | — | — | 7.3% | — | — |
| Malic acid | — | — | 14.6% | — | 7.3% | 7.3% | — |
| Glutaric Acid | — | — | — | 14.6% | — | 7.3% | — |
| Maleic Acid | — | — | — | — | — | — | 7.3% |
| Dimethylmalonic acid | — | — | — | — | — | — | 7.3% |
| Phosphoric acid | 4.3% | 4.3% | 4.3% | 4.3% | 4.3% | 4.3% | — |
| Polyphosphoric acid | — | — | — | — | — | — | 4.3% |
| Water-soluble Polymer A (16% aqueous solution) | 2.5% | 2.5% | 2.5% | 2.5% | 2.5% | 2.5% | 2.5% |
| Benzotriazole | 1% | 1% | 1% | 1% | 1% | 1% | 1% |
| Silicon Emulsion TSA-739 | 0.005% | 0.005% | 0.005% | 0.005% | 0.005% | 0.005% | 0.005% |
| Ion-exchanged Water | 67% | 67% | 67% | 67% | 67% | 67% | 67% |
| pH | 1.2 | 1.2 | 1.1 | 0.8 | 0.9 | 0.8 | 0.8 |
| Surface Tension (mN/m) | 42 | 44 | 42 | 42 | 41 | 42 | 42 |

<Description of Table 4>

The details of silicon emulsion disclosed in the Table 4 is as follows.

TSA-739 (15%): emulsion type silicon defoaming agent manufactured by Momentive Performance Materials Japan LLC.

What is claimed is:

1. An ink set comprising:
   an ink composition comprising resin particles and a pigment; and
   a process liquid comprising an organic acidic compound and at least one of phosphoric acid and a phosphoric acid compound,
   wherein the organic acidic compound comprises a compound represented by General Formula (I), and a compound containing two carboxyl groups within one molecule, $$C_nH_{2n+2-m}(COOH)_m \quad \text{(I)}$$

wherein, n represents an integer of greater than or equal to 2, and m represents an integer of greater than or equal to 3.

2. The ink set according to claim 1, wherein the content of the compound represented by General Formula (I) in the organic acidic compound is 5 mass % to 30 mass %.

3. The ink set according to claim 1, wherein the content of the organic acidic compound with regard to a total sum of the organic acidic compound, the phosphoric acid and the phosphoric acid compound is 60 mass % to 90 mass %.

4. The ink set according to claim 1, wherein n in General Formula (I) is an integer of 3 to 5.

5. The ink set according to claim 1, wherein the compound represented by General Formula (I) is at least one selected from the group consisting of 1,2,3-propanetricarboxylic acid, 1,3,5-pentanetricarboxylic acid, and 1,2,3,4-butanetetracarboxylic acid.

6. The ink set according to claim 1, wherein the compound containing two carboxyl groups within one molecule is at least one selected from the group consisting of DL-malic acid, malonic acid, glutaric acid, dimethylmalonic acid, and maleic acid.

7. The ink set according to claim 1, wherein the content of the compound represented by General Formula (I) with regard to a total amount of the process liquid is 0.5 mass % to 10 mass %.

8. The ink set according to claim 1, wherein the resin particles are self-dispersing resin particles.

9. The ink set according to claim 8, wherein the self-dispersing particles comprise a polymer having a carboxyl group and with an acid value of 25 to 100 mg KOH/g.

10. An image forming method, comprising:
    providing the ink set according to claim 1;
    a process liquid applying step for applying the process liquid on a recording medium; and
    an ink applying step for applying the ink composition on the recording medium.

11. The image forming method according to claim 10, further comprising a heat fixing step for fixing an image formed from the process liquid applying step and the ink applying step by heat.

12. The image forming method according to claim 10, wherein the recording medium has a coat layer containing calcium carbonate.

13. The ink set according to claim 1, wherein the organic acidic compound comprises two or more said compounds containing two carboxyl groups within one molecule.

* * * * *